(12) United States Patent
Naka et al.

(10) Patent No.: US 9,666,222 B2
(45) Date of Patent: May 30, 2017

(54) OPTICAL INFORMATION RECORDING MEDIUM HAVING FIRST AND SECOND PIT ROW OF IDENTICAL REFLECTANCE

(71) Applicants: Sharp Kabushiki Kaisha, Sakai, Osaka (JP); Memory-Tech Holdings Inc., Minato-ku, Tokyo (JP)

(72) Inventors: Takayuki Naka, Sakai (JP); Hirohisa Yamada, Sakai (JP); Masaki Yamamoto, Sakai (JP); Hideharu Tajima, Sakai (JP); Masahito Konishi, Chikusei (JP)

(73) Assignees: SHARP KABUSHIKI KAISHA, Sakai (JP); MEMORY-TECH HOLDINGS INC., Tokyo (JP)

(*) Notice: Subject to any disclaimer, the term of this patent is extended or adjusted under 35 U.S.C. 154(b) by 0 days.

(21) Appl. No.: 15/369,916

(22) Filed: Dec. 6, 2016

(65) Prior Publication Data
US 2017/0084301 A1    Mar. 23, 2017

Related U.S. Application Data

(63) Continuation of application No. 15/200,049, filed on Jul. 1, 2016, now Pat. No. 9,552,838, which is a (Continued)

(30) Foreign Application Priority Data

Jun. 7, 2013  (JP) ................. 2013-120958

(51) Int. Cl.
G11B 7/24      (2013.01)
G11B 7/013    (2006.01)
(Continued)

(52) U.S. Cl.
CPC ............ *G11B 7/013* (2013.01); *G11B 7/0052* (2013.01); *G11B 7/24085* (2013.01);
(Continued)

(58) Field of Classification Search
None
See application file for complete search history.

(56) References Cited

U.S. PATENT DOCUMENTS 5,493,561 A * 2/1996 Nishiuchi .......... G11B 7/00454
369/275.1
8,134,909 B2 * 3/2012 Yamamoto .......... G11B 7/0053
369/275.3

(Continued)

OTHER PUBLICATIONS

Naka et al., "Optical Information Recording Medium Having First and Second Pit Row of Identical Reflectance", U.S. Appl. No. 15/200,049, filed Jul. 1, 2016.

*Primary Examiner* — Tan X Dinh
(74) *Attorney, Agent, or Firm* — Keating & Bennett, LLP

(57) ABSTRACT

In a case where (i) a reflectance calculated from a reflected light amount obtained from a longest pit (P1max) or a longest space (S1max) in a first pit row is defined as a first reflectance and (ii) a reflectance calculated from a reflected light amount obtained from a longest pit (P2max) or a longest space (S2max) in the second pit row is defined as a second reflectance, the first pit row is formed such that the first reflectance becomes substantially identical with the second reflectance.

4 Claims, 19 Drawing Sheets

Related U.S. Application Data continuation-in-part of application No. 14/895,241, filed as application No. PCT/JP2014/060171 on Apr. 8, 2014, now Pat. No. 9,412,408.

(51) Int. Cl.
| | | |
|---|---|---|
| *G11B 7/005* | (2006.01) | |
| *G11B 7/24085* | (2013.01) | |
| *G11B 7/24079* | (2013.01) | |
| *G11B 7/007* | (2006.01) | |

(52) U.S. Cl.
CPC ............ *G11B 7/005* (2013.01); *G11B 7/007* (2013.01); *G11B 7/00745* (2013.01); *G11B 7/24* (2013.01); *G11B 7/24079* (2013.01); *G11B 2007/0133* (2013.01)

(56) References Cited

U.S. PATENT DOCUMENTS

| | | | | |
|---|---|---|---|---|
| 2005/0157631 | A1* | 7/2005 | Lee | G11B 7/00736 369/275.3 |
| 2007/0274185 | A1* | 11/2007 | Kikukawa | G11B 7/005 369/59.1 |
| 2009/0106627 | A1* | 4/2009 | Minemura | G11B 20/10009 714/758 |
| 2010/0220567 | A1* | 9/2010 | Tajima | G11B 7/00736 369/47.15 |
| 2016/0125908 | A1* | 5/2016 | Naka | G11B 7/0079 369/275.5 |
| 2016/0314812 | A1* | 10/2016 | Naka | G11B 7/0079 369/275.3 |

\* cited by examiner

F I G. 1 0
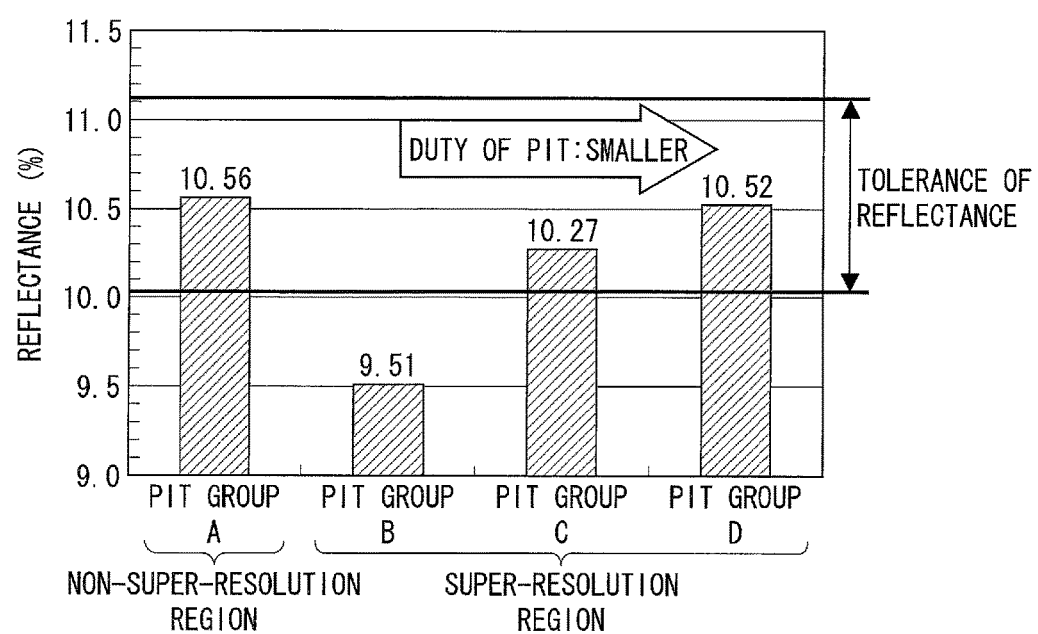

F I G. 1 1
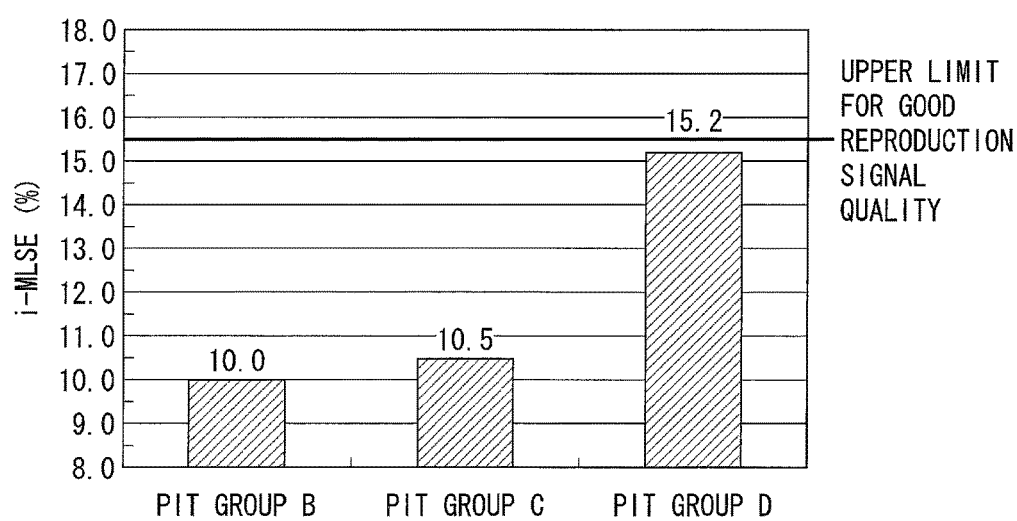

F I G. 1 4
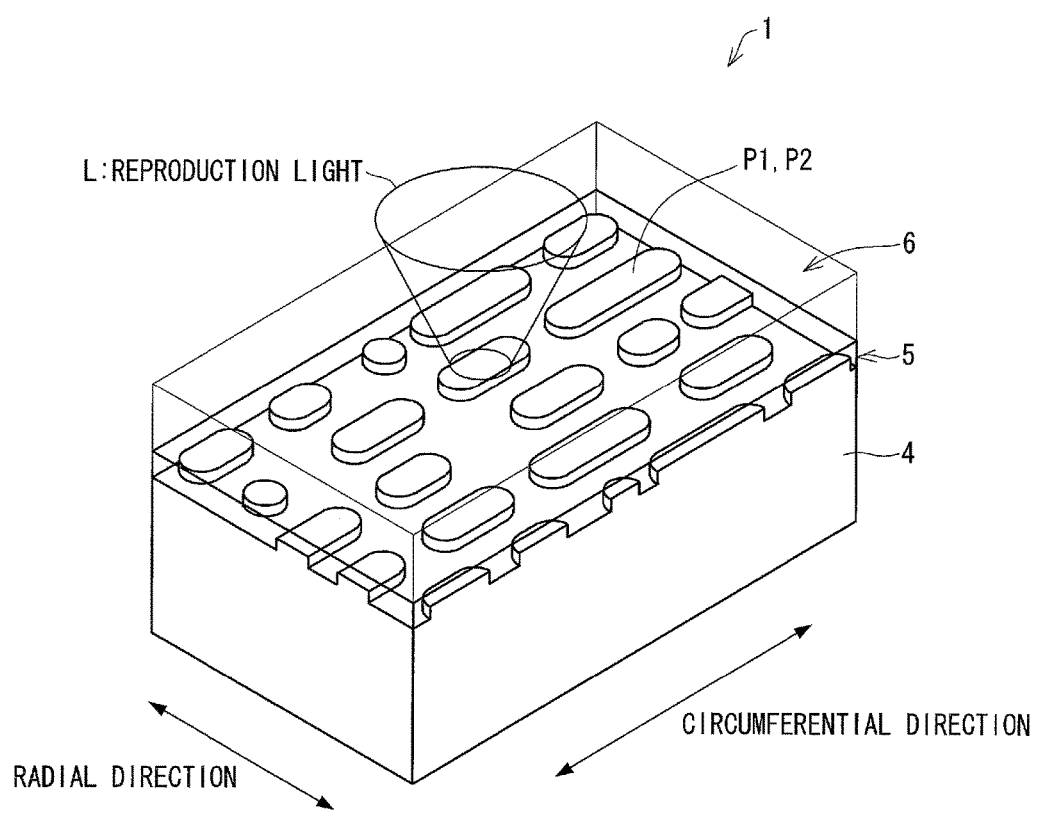

F I G. 1 6
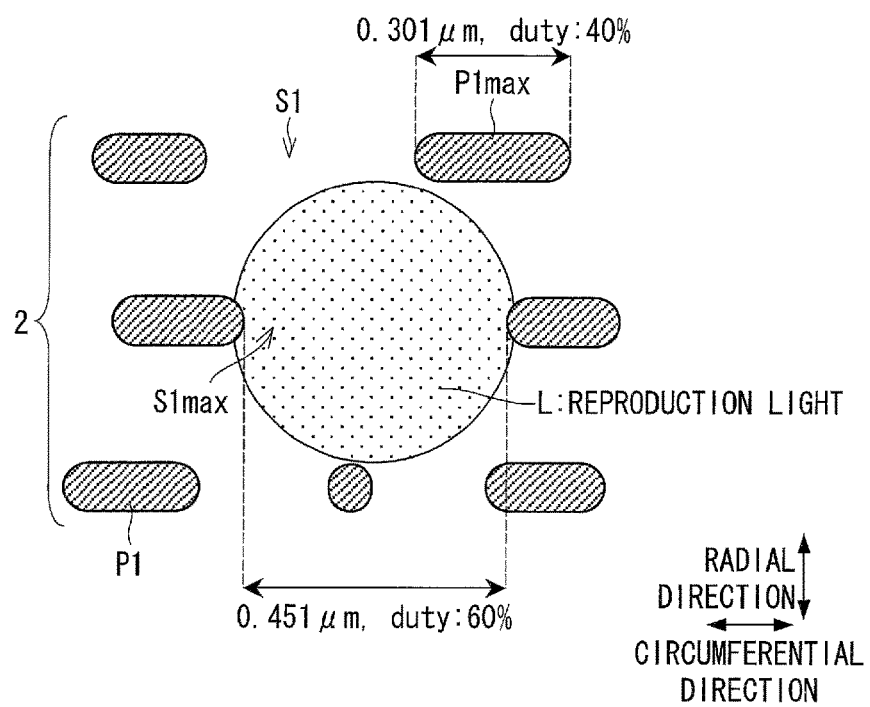

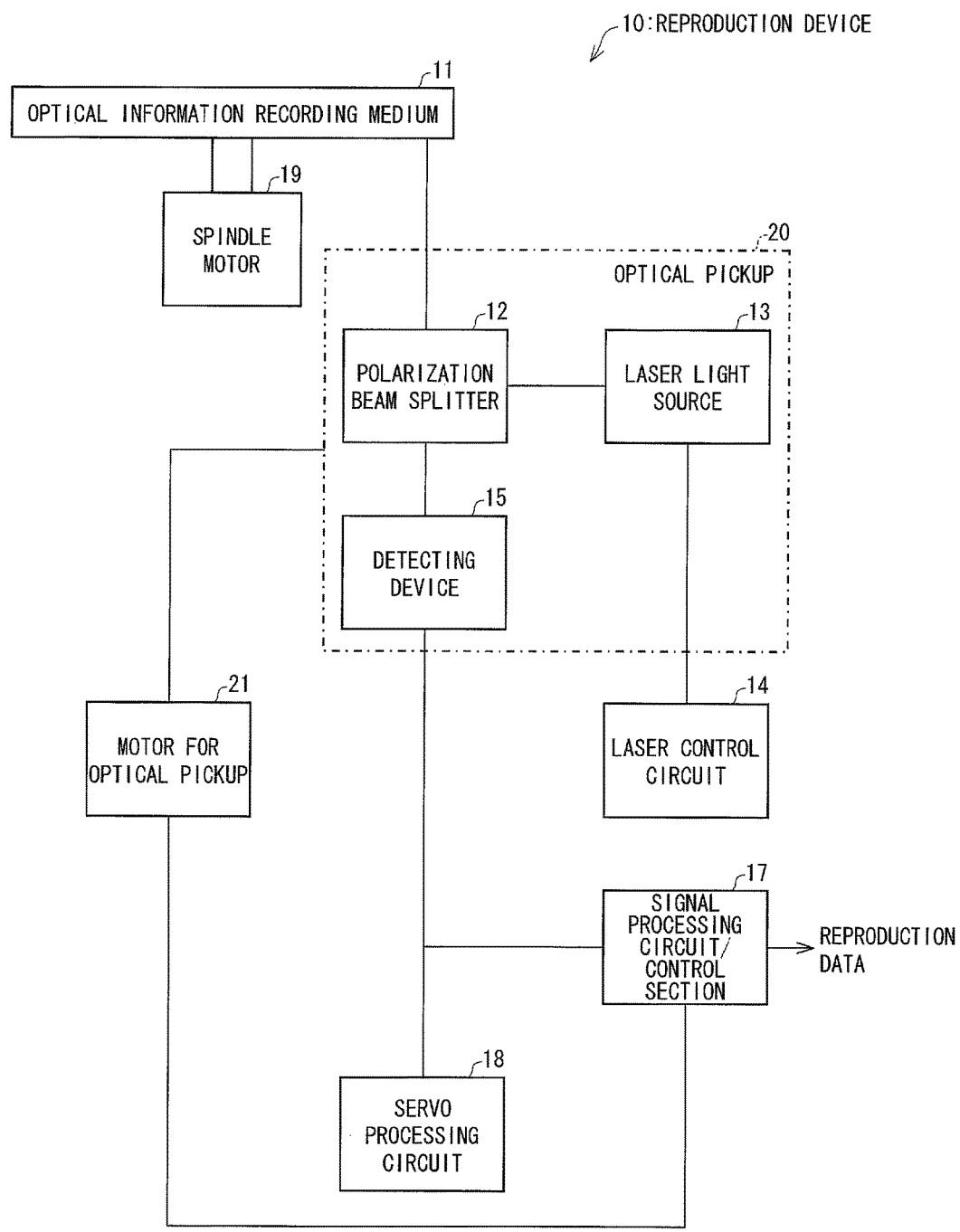
F I G. 1 7

OPTICAL INFORMATION RECORDING MEDIUM HAVING FIRST AND SECOND PIT ROW OF IDENTICAL REFLECTANCE

TECHNICAL FIELD

The present invention relates to (i) an optical information recording medium on which information can be recorded and (ii) a reproduction method and a reproduction device for reproducing the optical information recording medium.

BACKGROUND ART

In order to store a huge amount of information such as a high image quality video, there has recently been a demand for increase in capacity, i.e., enhancement in recording density of optical information recording mediums. Under the circumstances, a super-resolution technique has been proposed in which an optical information recording medium (super-resolution medium), in which information is recorded with high density by a pit row that includes a pit whose length is shorter than that of an optical system resolution limit of a reproduction device, is reproduced at a reproduction light intensity (reproduction laser power) higher than that used to reproduce an optical information recording medium (normal medium) in which information is recorded by a pit row that does not include a pit whose length is equal to or shorter than that of the optical system resolution limit. Note that, in a case where (i) a wavelength of reproduction light to be emitted by the reproduction device is $\lambda$ and (ii) a numerical aperture of an objective lens is NA, the optical system resolution limit is represented by $\lambda/4NA$.

As an example of such a super-resolution medium, Patent Literature 1 discloses an optical information recording medium having (i) a first region in which a content is recorded by pits (recesses and/or projections) including a pit whose length is shorter than that of an optical system resolution limit and (ii) a second region in which medium identification information for specifying a type of the medium is recorded by pits. In this optical information recording medium, pits that represent the medium identification information each have a length equal to or longer than that of the optical system resolution limit. According to this arrangement, when the super-resolution medium is identified, the super-resolution medium can be identified at reproduction laser power that is suitable for reproducing information recorded on a normal medium.

CITATION LIST

Patent Literature

[Patent Literature 1]
International Publication No. 2007/100139 (Publication date: Sep. 7, 2007)

SUMMARY OF INVENTION

Technical Problem

However, in the optical information recording medium of Patent Literature 1, the pits formed in the first region are different in length and pit interval from the pits formed in the second region. That is, the first region differs from the second region in information recording density.

In such a case, there is a possibility that a difference occurs between a reflectance obtained from the first region and a reflectance obtained from the second region, and thus the reproduction device cannot assume that these reflectances are substantially identical with each other. In a case where (i) the above described difference in reflectance occurs and (ii) reproduction of information in a first one of regions and reproduction of information in a second one of the regions are sequentially carried out, there may occur a phenomenon such as being out-of-focus in the second one of the regions.

The present invention is accomplished in view of the above problem. The object of the present invention is to provide (i) an optical information recording medium that can improve information reproduction quality and (ii) a reproduction device and the like that can reproduce the optical information recording medium.

Solution to Problem

In order to attain the object, an optical information recording medium in accordance with an aspect of the present invention includes: a recording layer which includes (i) a first region in which information is recorded by a first pit row that includes a pit whose length is shorter than that of an optical system resolution limit of a reproduction device and (ii) a second region in which information is recorded by a second pit row that is made up of pits whose length is equal to or longer than that of the optical system resolution limit, in a case where (i) a reflectance calculated from a reflected light amount obtained from a longest pit or a longest space in the first pit row is defined as a first reflectance and (ii) a reflectance calculated from a reflected light amount obtained from a longest pit or a longest space in the second pit row is defined as a second reflectance, the first pit row being formed such that the first reflectance becomes substantially identical with the second reflectance.

Advantageous Effects of Invention

According to the aspect of the present invention, it is possible to bring about an effect of improving information reproduction quality.

BRIEF DESCRIPTION OF DRAWINGS

FIG. 10 is a view illustrating an experiment result of an Experiment Example in relation to the super-resolution medium.

FIG. 11 is a view illustrating an experiment result of an Experiment Example in relation to the super-resolution medium.

FIG. 14 is a view illustrating a polarity of pits in a super-resolution medium in accordance with still another embodiment of the present invention.

FIG. 16 is a view illustrating, in an Example of a super-resolution medium in accordance with yet another embodiment of the present invention, a state in which a data region is partially (in the vicinity of a longest space) irradiated with reproduction light.

FIG. 17 is a block diagram illustrating an example of a reproduction device in accordance with still another embodiment of the present invention.

DESCRIPTION OF EMBODIMENTS

Embodiment 1

The following description will discuss an optical information recording medium in accordance with an embodiment of the present invention with reference to FIGS. 1 through 11. In Embodiment 1, an optical information recording medium (hereinafter, referred to as "super-resolution medium 1") will be described as an example, and the super-resolution medium 1 is a read-only medium and has a super-resolution region whose cross sectional structure is of a BD (Blu-ray Disc: Registered Trademark) type. Note, however, that Embodiment 1 is not limited to this. The super-resolution medium 1 can be, for example, an optical information recording medium on which information can be recorded or a digital versatile disc (DVD).

[Structure of Super-Resolution Medium 1]

Figure 2:
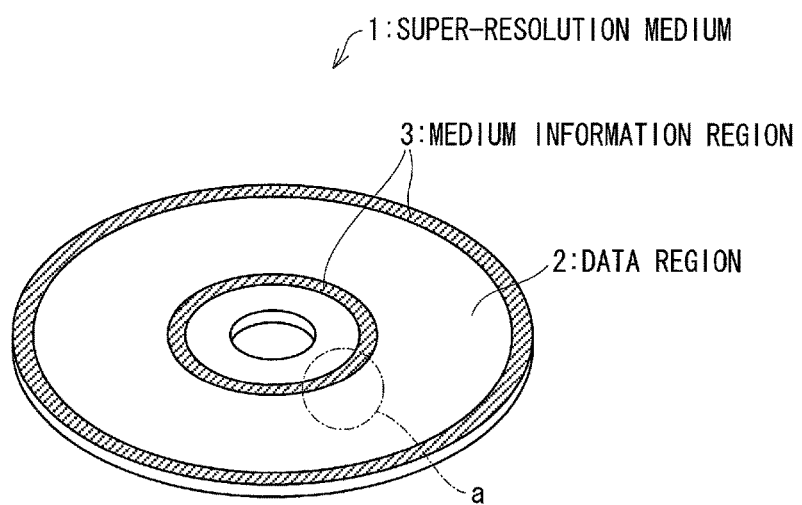
FIG. 2 is a perspective view illustrating an appearance of the super-resolution medium.

FIG. 2 illustrates an appearance of the super-resolution medium 1 in accordance with Embodiment 1. As illustrated in FIG. 2, the super-resolution medium 1 which is a discoid medium includes a recording layer having, in advance, (i) a data region 2 (first region) in which, for example, a content such as a video or software is recorded and (ii) a medium information region 3 (second region) in which, for example, information relating to the super-resolution medium 1 is recorded.

Figure 3:
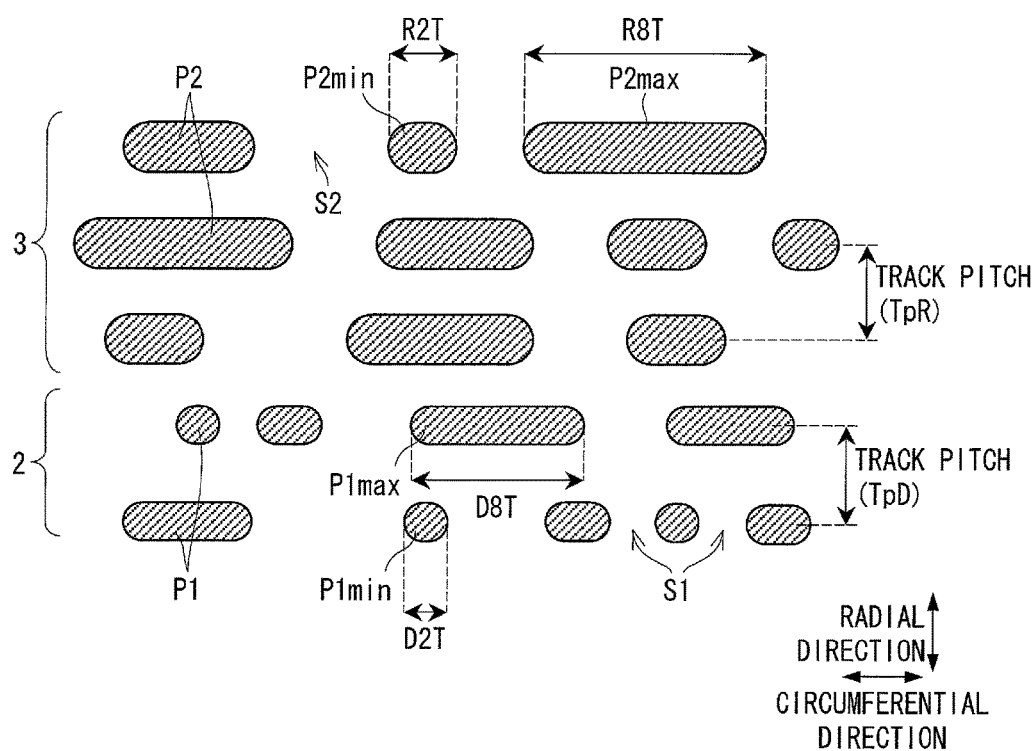
FIG. 3 is a plan view illustrating a configuration of main parts of a substrate included in the super-resolution medium.

FIG. 3 is an enlarged view of part a of the super-resolution medium 1 illustrated in FIG. 2. As illustrated in FIG. 3, in the data region 2 and the medium information region 3, a plurality of pits P1 (pits in first pit row), a plurality of pits P2 (pits in second pit row), a plurality of spaces S1 (first space) formed between the plurality of pits P1, and a plurality of spaces S2 (second space) formed between the plurality of pits P2 are formed so as to make rows which (i) extend in a circumferential direction and (ii) are apart from each other at predetermined track pitches TpD and TpR (predetermined intervals). In other words, a first pit row is formed by pits P1 and spaces S1 in the data region 2, and a second pit row is formed by pits P2 and spaces S2 in the medium information region 3.

As a method for recording information in the data region 2 and the medium information region 3, a mark-edge recording method is employed in which information can be recorded by the use of (i) pits P1 and P2 which are different in shape and size and (ii) spaces S1 and S2 which are different in shape and size. In Embodiment 1, among such methods, a modulation recording method (record encoding method) called 1-7 PP (1-7 Parity Preserve/Prohibit RMTR (Repeated Minimum Transition Run Length)) is employed. That is, in this method, the pits P1 and P2 are formed with a modulation method which is one of (1,7) RLL (Run Length Limited) modulations. For example, on a BD, information is recorded by pits (or recording mark) of 2T to 8T and spaces of 2T to 8T. In Embodiment 1, for convenience, a length of a pit P1 in the data region 2 is sometimes represented by "D2T to D8T", and a length of a pit P1 in the medium information region 3 is sometimes represented by "R2T to R8T".

Note that, in the modulation, (i) a bit string pattern of original information is converted into a recording pattern which has a predetermined frequency bandwidth (that is, has a combination of recording marks and spaces which are restricted to some types), without depending on the bit string pattern of the original information (i.e., information before modulation) and (ii) a length of a shortest recording mark or space is enlarged so as to be longer than its length in the original information, and thus recording density is magnified. In a case of the 1-7 PP modulation recording method, a 2-bit unit in original information is converted into a 3-channel-bit unit so that recording marks and spaces are obtained which have restricted lengths of 2-channel bit (2T) to 8-channel bit (8T) as a modulated recording pattern, and thus a frequency bandwidth is restricted. Further, a length of a shortest recording mark and a length of a shortest space are enlarged by 1.5 times from those in the original information. Therefore, the modulation carried out with the 1-7 PP modulation recording method is suitable for high density recording. Note that the modulation method is not limited to the 1-7 PP modulation and other modulation methods suitable for high density recording can be employed. Examples of such modulation methods encompass (1,7) RLL modulation other than the 1-7 PP modulation, 8/16 modulation, and (2,7) RLL modulation.

(Data Region 2)

As illustrated in FIG. 2, the data region 2 is provided between medium information regions 3, and the content is recorded in the data region 2 by providing the pits P1 when the substrate is formed. The pits P1 have lengths of D2T to D8T as illustrated in FIG. 3 and a length D2T of a shortest pit P1min is shorter than an optical system resolution limit of a reproduction device. That is, the content is recorded by pits P1 which include the pit P1 whose length is shorter than the optical system resolution limit of the reproduction device (i.e., super-resolution recording form), and this makes it possible to record information with higher density than that of a normal medium.

Note that a pit having the length of D8T is a longest pit P1max among the plurality of pits P1 formed in the data region 2. Moreover, among the plurality of spaces S1 formed between the plurality of pits P1, a shortest one of the spaces S1 is a shortest space S1min (not illustrated) and a longest one of the spaces S1 is a longest space S1max (longest first space) (see (a) of FIG. 1).

(Medium Information Region 3)

As illustrated in FIG. 2, the medium information region 3 is provided in advance in each of an innermost peripheral part and an outermost peripheral part of the super-resolution medium 1, and information relating to the super-resolution medium 1 is recorded in the medium information region 3 by the pits P2 (normal recording form). The pits P2 have lengths of R2T to R8T as illustrated in FIG. 3, and a length R2T of a shortest pit P2min is equal to or longer than the optical system resolution limit of the reproduction device. That is, lengths of all the pits P2 in the medium information region 3 are longer than the shortest pit P1min in the data region 2, and information recording density in the medium information region 3 is lower than that in the data region 2.

Note that a pit having the length of R8T is a longest pit P2max among the plurality of pits P2 formed in the medium information region 3. Moreover, among the plurality of spaces S2 formed between the plurality of pits P2, a shortest one of the spaces S2 is a shortest space S2min (not illustrated), and a longest one of the spaces S2 is a longest space S2max (longest second space) (see (a) of FIG. 6).

The medium information region 3 is provided in each of the inner periphery and the outer periphery of the super-resolution medium 1. Note, however, that the medium information region 3 is not limited to this and can be provided in any one of the inner periphery and the outer periphery.

As above described, the super-resolution medium 1 is an optical information recording medium in which a so-called super-resolution technique is used. Moreover, the data region 2 is a super-resolution region from which information is reproduced by the super-resolution technique, and the medium information region 3 is a non-super-resolution region from which information is reproduced without using the super-resolution technique.

(Example of Information Recorded in Medium Information Region 3)

The information relating to the super-resolution medium 1 encompasses, for example, medium identification information for specifying the super-resolution medium 1, region location information for specifying a location in the data region 2, and data management information for managing data recorded in the data region 2 and in the medium information region 3.

The medium identification information encompasses, for example, (i) disk type identification information such as information indicative of a type (BD, DVD, etc., or read-only, write-once, rewritable, etc.) and a storage capacity of the optical information recording medium and/or (ii) individual identification information (such as unique number of medium for copy protection) for identifying an individual optical information recording medium (i.e., identifying the super-resolution medium 1).

It is preferable that the information relating to the super-resolution medium 1 includes reproduction speed information, reproduction light intensity information, polarity information, and/or region location information. The medium identification information can include reproduction speed information and reproduction light intensity information.

The reproduction speed information is indicative of a reproduction speed required for seamlessly reproducing a content such as video information. Moreover, the reproduction speed information includes (i) reproduction speed range information which is necessary to obtain an analog waveform that can be converted into a digital signal in a case where the super-resolution medium 1 is irradiated with appropriate reproduction light (reproduction laser), (ii) digital process information which is necessary to convert an analog waveform, which has been reproduced to reproduce a content or the like, into a digital signal, or (iii) a combination of these pieces of information.

The reproduction speed range information is information defining a reproduction speed for stably obtaining an analog waveform by super-resolution reproduction. Specifically, the reproduction speed range information is necessary because, in a case where super-resolution reproduction is enabled by heat, (i) an excessively high reproduction speed causes insufficient heat and accordingly the super-resolution reproduction cannot be carried out and (ii) an excessively low reproduction speed causes excessive increase in generated heat energy and accordingly the medium is damaged.

Note that the reproduction speed indicates a linear speed in reproduction (i.e., a relative velocity which (i) is between a location of an optical head (from which reproduction light is emitted) and a reproduction location of the optical information recording medium and (ii) is caused when the optical information recording medium is rotated by a spindle motor in reproduction of the medium).

The digital process information includes, for example, reproduction clock switching information, reproduction speed switching information, or a combination of these pieces of information. These pieces of information are necessary, for example, for converting, into a digital signal, an analog waveform which has been obtained in a case where information is reproduced which has been recorded with the 1-7 PP modulation method in the data region 2 and the medium information region 3 which are different in recording density.

The reproduction light intensity information includes reproduction light intensity range information which is necessary for obtaining, in a case where the super-resolution medium 1 is irradiated with reproduction light (reproduction laser), an analog waveform that can be converted into a digital signal. In a case where super-resolution reproduction is enabled by heat, (i) an excessively low reproduction light intensity causes insufficient heat and accordingly the super-resolution reproduction cannot be carried out and (ii) an excessively high reproduction light intensity causes excessive increase in generated heat energy and accordingly the medium is damaged and a load is applied to the reproduction device. The reproduction light intensity range information is information which defines reproduction light intensity for obtaining a stable analog waveform without applying an excessive load to the reproduction device by super-resolution reproduction.

The polarity information includes information such as pit polarity information indicative of whether the pits P1 and P2 are concave (in-pit form) or convex (on-pit form) with respect to a side from which reproduction light for the super-resolution medium 1 is emitted. For example, in a case where a tracking servo is operated with a push-pull (PP) method or a differential push-pull (DPP) method, a polarity (i.e., positive or negative) of a tracking error signal varies depending on a polarity of the pits P1 and P2. The pit polarity information makes it possible to immediately determine whether a tracking error signal, which is in a state (on-track state) where an irradiation location of reproduction light is at a center of a track, is (i) at a center of amplitude of a tracking error signal whose first derivation value relating to a distance from a center of the super-resolution medium 1 is positive or (ii) at a center of amplitude of a tracking error signal whose first derivation value relating to the distance from the center of the super-resolution medium 1 is negative.

The region location information includes, for example, data region location information indicative of a location of the data region 2 in the super-resolution medium 1. The data region location information can be, for example, (i) information indicative of starting location and/or ending location of reproduction of information in the data region 2, (ii) information indicative of starting location and/or ending location of reproduction of information in the medium information region 3, or (iii) a combination of these pieces of information. The data region location information is used, for example, in a case where the reproduction device sequentially reproduces pieces of information in the data region 2 and the medium information region 3 which are different in recording density and for which suitable information reproduction conditions are differently set. Specifically, the data region location information is necessary for the reproduction device to switch one of the information reproduction conditions, which are set for respective of the data region 2 and the medium information region 3, to the other.

Note that the information reproduction condition indicates (i) any of conditions such as reproduction light intensity, a reproduction speed, and a type of tracking servo and (ii) a condition that needs to be set for the reproduction device to reproduce information recorded in the optical information recording medium.

(Specific Structure of Super-Resolution Medium 1)

Figure 4:
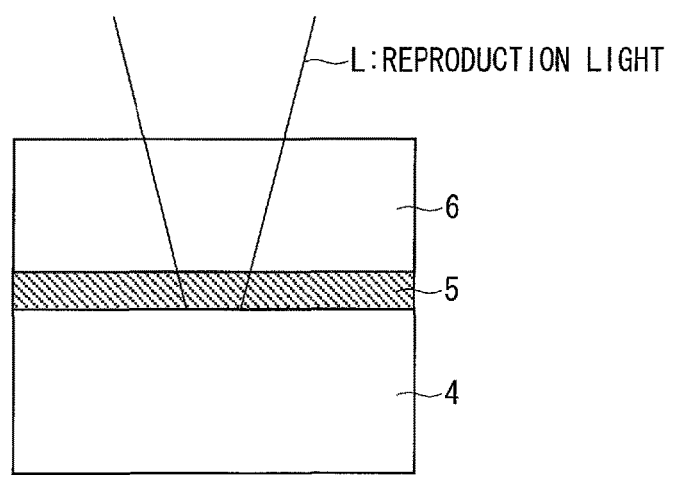
FIG. 4 is a cross-sectional view illustrating a structure of the super-resolution medium.
Figure 5:
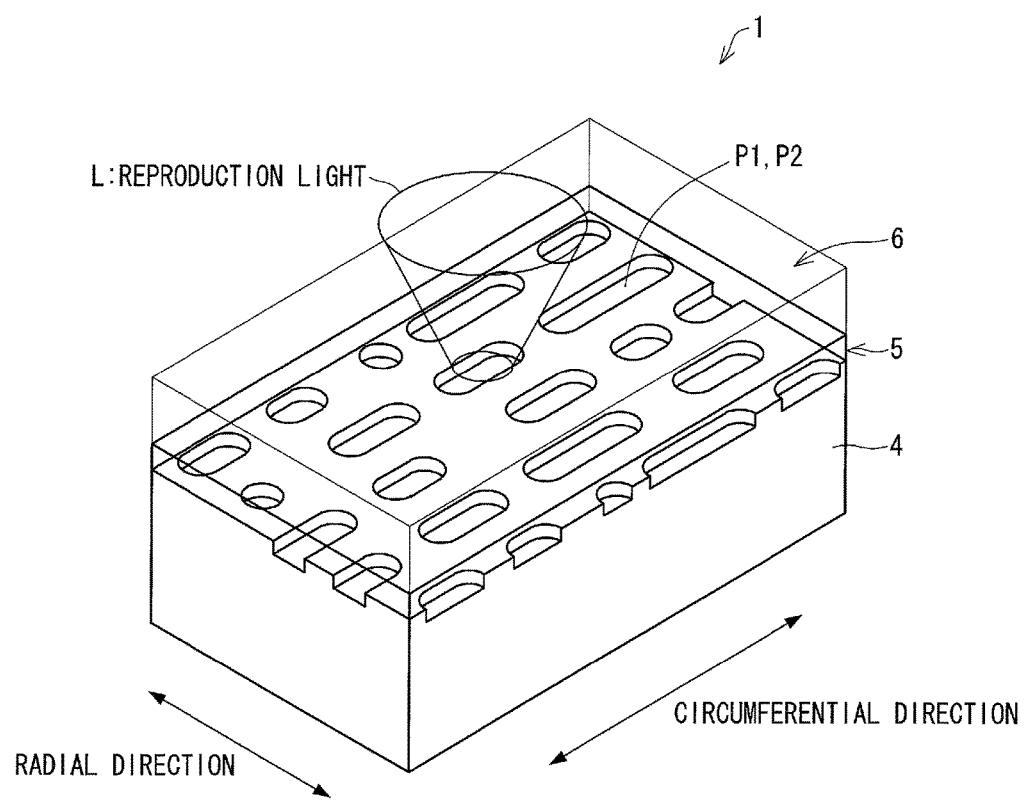
FIG. 5 is a view illustrating a polarity of pits in the super-resolution medium.

The following description will discuss a specific structure of the super-resolution medium 1. FIG. 4 is a cross-sectional view of the super-resolution medium 1. FIG. 5 illustrates a polarity of the pits P1 and P2.

As illustrated in FIG. 4, the super-resolution medium 1 includes a cover layer 6, a functional layer 5, and a substrate 4 which are arranged in this order from a side which is irradiated with reproduction light L emitted by the reproduction device.

The substrate 4 is, for example, made of polycarbonate (PC) and has a diameter of approximately 120 mm and a thickness of approximately 1.1 mm. On the side to which the reproduction light L is emitted, pieces of information are recorded in concave pits P1 and P2 formed in the substrate 4 (in-pit form) (see FIG. 5). That is, recessed parts formed in the substrate 4 are the pits P1 and P2. Note that the pits P1 and P2 can be (i) convex pits or (ii) concave pits and convex pits. That is, the pits P1 and P2 can be concave and/or convex. Note that a structure in which the pits P1 and P2 are convex pits (on-pit form) will be described in Embodiment 3.

The cover layer 6 is, for example, made of ultraviolet-curable resin and has a thickness of approximately 100 μm (for example, has a refractive index of 1.50 with respect to reproduction light L having a wavelength λ=405 nm). The cover layer 6 merely needs to be made of a material having high transmittance with respect to the wavelength of the reproduction light L and can be, for example, formed from (i) a film made of polycarbonate (polycarbonate film) and (ii) a transparent adhesive material.

The functional layer 5 is a layer for generating a super-resolution phenomenon and is formed on the substrate 4 by, for example, sputtering. The functional layer 5 is, for example, made of tantalum (Ta) and has a thickness of approximately 12 nm. The functional layer 5 can be made up of two or more types of films. In this case, for example, the functional layer 5 can be made up of (i) a light absorption film which can absorb the reproduction light L, has a thickness of approximately 8 nm, and is made of tantalum and (ii) a super-resolution reproduction film which has a thickness of approximately 50 nm and is made of zinc oxide (ZnO). In this case, it is possible to increase information recording density.

It is possible to provide two or more functional layers 5. In this case, an intermediate layer(s) can be provided between the two or more functional layers 5. The intermediate layer can be made of, for example, ultraviolet-curable resin. However, a material of the intermediate layer is not limited to this, provided that the material has high transmittance with respect to the wavelength of the reproduction light L. Each of the intermediate layer(s) can be provided with at least pits P1 on the side to which the reproduction light L is emitted. In this case, it is possible to further increase a storage capacity of the super-resolution medium 1.

By providing the functional layer 5 above described, information recorded by the pits P1 in the data region 2 can be reproduced. In a case where the functional layer 5 is made up of a thin metal film or the like, it is possible to reproduce a signal of a pit, whose length is shorter than that of an optical system resolution limit, by changing a temperature of the functional layer 5. Alternatively, in a case where the functional layer 5 is made up of a light absorption film and a super-resolution reproduction film and the pits P1 are irradiated with the reproduction light, an irradiation region (laser spot) of the reproduction light is formed on the super-resolution medium 1, and distribution of transmittance is caused, in the irradiation region, by temperature distribution that is caused due to light intensity distribution. As a result, the irradiation region goes into a pseudo-shrinkage state, and thus information recorded by the pits P1 can be reproduced. From this, it is possible to record information more than that recorded in a normal medium.

(Pit Shape in Each Region)

Figure 1:
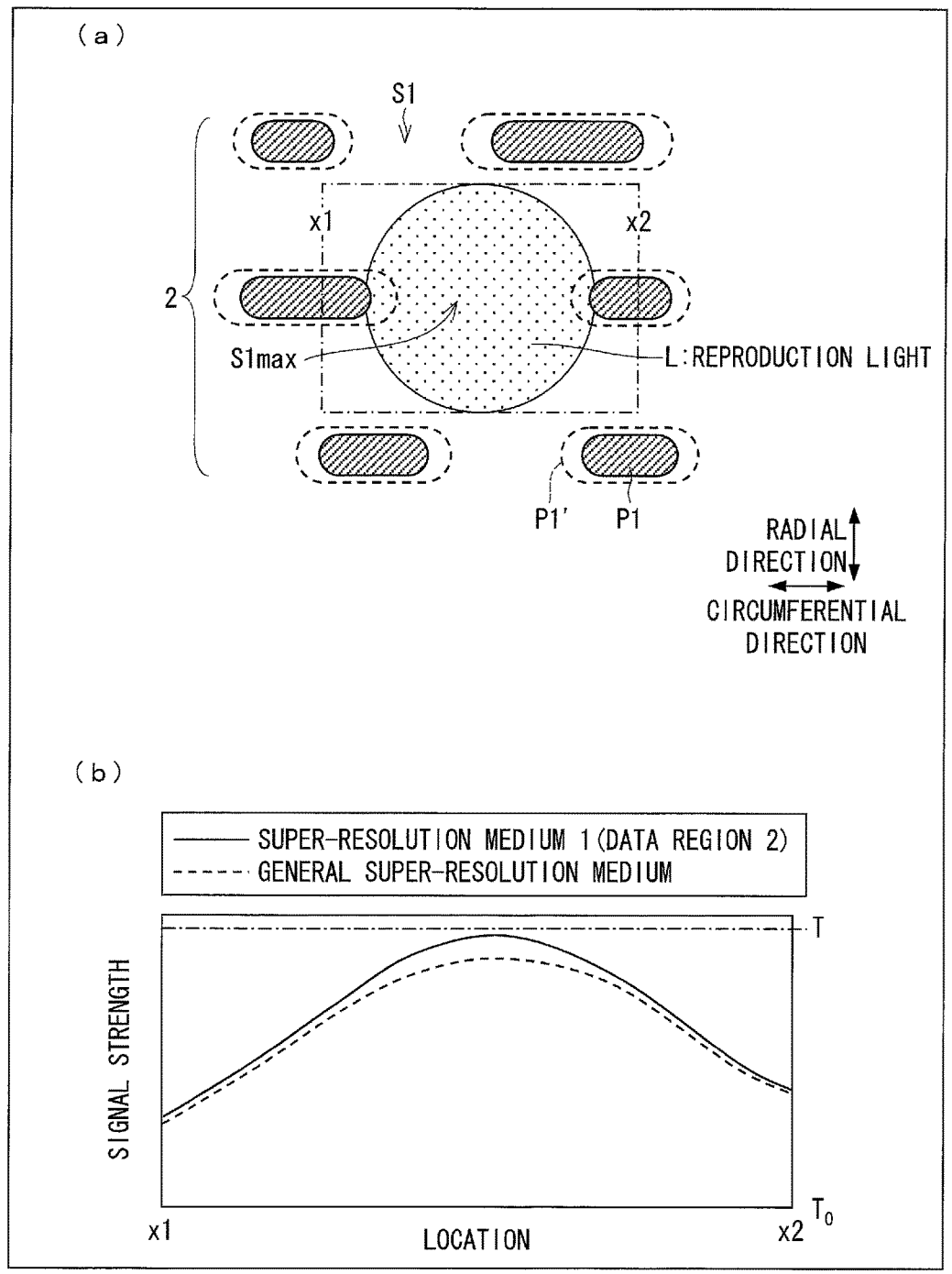
FIG. 1 is a view for explaining shapes of pits on a super-resolution medium in accordance with an embodiment of the present invention, where (a) illustrates an example of pit shapes in a data region and (b) illustrates a signal strength obtained from reproduction light which has been emitted onto an area that (i) includes a longest space and (ii) is indicated by dashed dotted lines in (a) of FIG. 1.

The following description will discuss a shape (size) of pits P1 in the super-resolution medium 1 with reference to FIG. 1. (a) of FIG. 1 illustrates an example of shapes of pits in the data region 2, and (b) of FIG. 1 illustrates a signal strength obtained by irradiating, with reproduction light L, an area which includes a longest space S1max and is indicated by dashed dotted lines in (a) of FIG. 1. In Embodiment 1, a ratio between (i) a length of a pit (recording mark) and (ii) a length of a space (e.g., space of 8T) corresponding to the pit (e.g., pit of 8T) is referred to as "duty", and a case where the ratio is 1:1 is referred to as "duty of 50%".

The lengths (duty) of the pit and the space can be increased or decreased within a range in which information can be reproduced by the reproduction device. The inventors of the present invention focused on the fact that the lengths (duty) can be increased or decreased, and found that it is possible to improve, in a super-resolution medium having a super-resolution region and a non-super-resolution region, a reflectance of the super-resolution region by changing lengths of pits and spaces, and it is accordingly possible to improve information reproduction quality in the super-resolution medium.

In order to improve the reproduction quality, in the super-resolution medium 1, the pits P1 are formed in the data region 2 such that a reflectance (first reflectance) in the data region 2 becomes substantially identical with a reflectance (second reflectance) in the medium information region 3. In other words, a first pit row which includes the pits P1 and is formed in the data region 2 is formed such that the first reflectance becomes substantially identical with the second reflectance. In still other words, the pits P1 are formed in the data region 2 such that the reproduction device can deal with the first and second reflectances as substantially identical reflectances, without providing different definitions of reflectance in respective of the data region 2 and the medium information region 3 with respect to the super-resolution medium 1 or the reproduction device.

Note that, in Embodiment 1, the reflectance is a ratio between (i) a value calculated from a maximum reflected light amount from a recording layer and (ii) intensity of reproduction light emitted, for example, by the reproduction device. Here, the maximum reflected light amount is measured by a detector of the reproduction device when a longest pit or a longest space is irradiated with the reproduction light while tracking a recording track (track). Note that the reflectance is not limited to the above described ratio but can be, for example, a ratio between intensity of reproduction light and intensity of light reflected from the recording layer.

That is, in the super-resolution medium 1 of Embodiment 1, the first reflectance (i.e., a reflectance obtained from the data region 2) is a reflectance calculated from a reflected light amount obtained from the longest pit P1max or the longest space S1max in the first pit row. Meanwhile, the second reflectance (i.e., a reflectance obtained from the medium information region 3) is a reflectance calculated from a reflected light amount obtained from the longest pit P2max or the longest space S2max in the second pit row. Note that the reflected light amount obtained from the longest pit or the longest space can be said as an amount of reflected light caused when the reproduction light L is reflected from the longest pit or the longest space.

Here, the recording layer is a layer which is of a normal medium or a super-resolution medium and in which information is recorded. In a case of a read-only optical information recording medium, the recording layer includes pits and a reflecting layer. The reflecting layer is a layer which is provided between a cover layer and a substrate that makes it possible to reproduce information recorded on the normal medium or the super-resolution medium. In the super-resolution medium, the reflecting layer is a functional layer.

In the normal medium, the reflecting layer is, for example, made of metal or a metal alloy and has a thickness of several tens of nanometers.

More specifically, as illustrated in (a) of FIG. 1, pits P1 (each of which has an elliptical shape indicated by solid lines in (a) of FIG. 1) in the super-resolution medium 1 are one size smaller than pits P1' (each of which has an elliptical shape indicated by dotted lines in (a) of FIG. 1) in a general super-resolution medium. That is, the pits P1 are formed so that a duty of the pits P1 becomes smaller than a duty of the spaces S1 (i.e., becomes smaller than a duty of the pits P1' in the general super-resolution medium). Note that an example of the general super-resolution medium encompasses a super-resolution medium in Comparative Example illustrated in FIG. 9. In this case, the pits P1' correspond to pits P101 shown in FIG. 9.

In Embodiment 1, the pit P1 in the super-resolution medium 1 and the pit P1' in the general super-resolution medium are similar figures. That is, a length of the pit P1 in a radial direction is changed in accordance with change in duty, as with a length in the circumferential direction. For example, in a case where a duty is 50%, a length of a pit (pit P1') is 0.448 μm, and a width of the pit (pit P1') is 0.112 μm, a length of the pit (pit P1) becomes 0.404 μm and a width of the pit (pit P1) becomes 0.101 μm when the duty has been changed to 45%. Note, however, that it is sufficient to change at least the length in the circumferential direction, and the width can be identical with, for example, the length of the pit P1'.

Here, as above described, in the super-resolution medium 1, the data region 2 is a super-resolution region in which information is recorded with the plurality of pits P1 whose length is shorter than that of the optical system resolution limit, and the medium information region 3 is a non-super-resolution region in which information is recorded with the plurality of pits P2 whose length is equal to or longer than that of the optical system resolution limit.

In general, upper limits of a pit length and a space length (i.e., pit interval) are defined depending on a modulation recording method that is used to record information. Therefore, depending on a length of a shortest pit, information recording density in an optical information recording medium varies. In a case of the above described 1-7 PP modulation recording method, a shortest pit length is 2T, and a longest pit length is 8T which is four times longer than the shortest pit length.

That is, in the super-resolution medium 1, the pit P1 have the length different from that of the pit P2, and therefore the data region 2 is different from the medium information region 3 in the information recording density. In this case, if the length of the pit P1 is identical with that of the space S1 and the length of the pit P2 is identical with that of the space S2 (i.e., duty of 50%), there is a possibility that a difference occurs between a reflectance at a predetermined location in the data region 2 and a reflectance at a predetermined location in the medium information region 3, and thus the reproduction device cannot assume that these reflectances obtained by the reproduction device are identical with each other. Note that the predetermined locations are locations corresponding to each other between the data region 2 and the medium information region 3. For example, the predetermined locations are respective longest pits (i.e., longest pits P1max and P2max) or respective longest spaces (i.e., longest spaces S1max and S2max) in the data region 2 and the medium information region 3.

Moreover, in general, various controls such as focus control are carried out in a reproduction device with the use of a reflectance. Therefore, in a case where the above described difference in reflectance occurs and reproduction of information in a first one of regions (e.g., the data region 2) and reproduction of information in a second one of the regions (e.g., the medium information region 3) are sequentially carried out, for example, a size of an irradiation region formed by reproduction light on an optical information recording medium in the second one of the regions changes (i.e., out of focus), and the reproduction device may need to carry out the focus control again every time the regions are switched.

In the super-resolution medium 1, although there is a difference in recording density between the data region 2 and the medium information region 3, the pits P1 having a shape (i.e., the shape is specified) which is different from that of the pits P1' in the general super-resolution medium are formed in the data region 2 (see (a) of FIG. 1). Therefore, even though there is the difference in recording density, it is possible to cause the reproduction device to deal with the super-resolution medium 1 as a medium in which the reflectance obtained from the data region 2 is identical with the reflectance obtained from the medium information region 3. The following description will discuss the reason that these two reflectances are substantially identical with each other, with reference to (b) of FIG. 1.

(b) of FIG. 1 shows a difference in signal strength between the super-resolution medium 1 and the general super-resolution medium caused in a case where the longest space S1max in the data region 2 illustrated in (a) of FIG. 1 is irradiated with reproduction light L. In (b) of FIG. 1, signal strength is indicated with is in a range from a location x1 to a location x2 in the circumferential direction in (a) of FIG. 1. Moreover, in (b) of FIG. 1, "T" represents a maximum value of the signal strength obtained when a non-super-resolution region (e.g., the medium information region 3) is irradiated with the reproduction light L and To represents signal strength of zero. A value proportional to a value obtained by $T-T_0$ is measured as a reflectance.

As illustrated in (b) of FIG. 1, a maximum value of signal strength (indicated by a dotted line in (b) of FIG. 1) obtained from the general super-resolution medium is lower than T. On the other hand, in a case of the super-resolution medium 1 (indicated by a solid line in (b) of FIG. 1), a maximum value of signal strength is substantially identical with T. That is, the reflectance obtained from the super-resolution medium 1 is higher than the reflectance obtained from the general super-resolution medium and is substantially identical with the reflectance obtained from the non-super-resolution region.

In a case where a space of the general super-resolution medium is irradiated with the reproduction light L as illustrated in (a) of FIG. 1, not only the space but also the pits P1' are irradiated with the reproduction light L. In general, signal strength obtained from a pit is lower than signal strength obtained from a space, and therefore the signal strength becomes lower in proportion to an amount of reproduction light with which the pit P1' is irradiated.

On the other hand, in the super-resolution medium 1, the duty is adjusted and the pits P1 are formed such that a length of a pit P1 becomes smaller than a length of a space S1 which corresponds to the pit P1, as above described. That is, as illustrated in (a) of FIG. 1, the pits P1 are formed in the data region 2 such that the length of the longest space S1max becomes equal to or longer than a diameter of the irradiation region (indicated by a circle in (a) of FIG. 1) formed by the reproduction light L on the super-resolution medium 1.

With the arrangement, the pits P1 are not (or are hardly) irradiated with the reproduction light L with which the longest space S1max is irradiated, and it is therefore possible to mostly eliminate a possibility that signal strength becomes lower. From this, it is possible to obtain signal strength (i.e., reflectance) that is substantially identical with that obtained from the medium information region 3 (longest space S2max) which is the non-super-resolution region.

As above described, in the super-resolution medium 1, each of the pits P1 has the shape (size) as above described. It is therefore possible to reduce a possibility that is caused because reflectances obtained from respective regions, from which pieces of information are sequentially reproduced (i.e., during sequential reproduction across the regions), are not substantially identical with each other (i.e., a difference occurs between reflectances to a degree that the reproduction device cannot deal with the reflectances as identical reflectances). For example, it is possible to reduce a possibility that a size of an irradiation region changes which is formed by reproduction light on an optical information recording medium. Therefore, even during the sequential reproduction, it is possible to promptly and surely reproduce information without repeatedly carrying out focus control.

That is, during the sequential reproduction, it is possible to reproduce information from a second one of regions without repeatedly carrying out a control that (i) is included in reproduction controls for a first one of the regions and (ii) can be maintained in the second one of the regions. This makes it possible to improve information reproduction quality.

In the 1-7 PP modulation recording method, an amount of reflected light (reflected light amount) obtained when the optical information recording medium is irradiated with reproduction light is determined mainly based on a length of a longest space, although pits in an adjacent track slightly influence the reflected light amount. Moreover, a reflectance is increased in accordance with an increase in reflected light amount.

In view of this, in the super-resolution medium 1, the pits P1 are formed in the data region 2 such that the length of the longest space S1max becomes equal to or longer than the diameter of the irradiation region as above described, and thus the reflectance in the longest space S1max is enhanced. That is, the pits P1 are formed in the data region 2 such that the reflectance in the longest space S1max becomes substantially identical with the reflectance in the longest space S2max (see (a) of FIG. 6).

Note that the length of the longest space S1max does not necessarily need to be equal to or larger than the diameter of the spot formed by the reproduction light L. That is, the length of the longest space S1max can be shorter than the diameter, provided that the reflectance obtained from the data region 2 is substantially identical with the reflectance obtained from the medium information region 3 (for example, provided that the reproduction device can assume that the reflectance obtained from the data region 2 (longest space S1max) is identical with the reflectance obtained from the medium information region 3 (longest space S2max)). An example of this case will be described in Embodiment 2.

In a case where another modulation recording method is employed, it is not necessary to set the shapes (duty) of the pits P1 while using, as a criterion, the reflectance obtained from the longest space S1max in order to improve the reflectance in the data region 2. For example, it is possible to set the shapes of the pits P1 while using, as a criterion, the reflectance obtained from the longest pit P1max.

The pits P1 and the pits P2 provided in the substrate 4 of the super-resolution medium 1 are formed by, for example, carrying out injection molding with respect to a master disk which has been prepared by a cutting machine. Note, however, that, in order to prevent an increase in time required for preparing the master disk, it is preferable that the pits P1 and the pits P2 are sequentially formed. However, the length of the pit P1 is different from not only the length of the pit P2 but also the length of the pit P1'. Therefore, as conditions for forming the pits P1 and the pits P2, not only speeds for forming the pits P1 and the pits P2 but also write strategies are different between the data region 2 and the medium information region 3. From this, pits P1 and pits P2 in the vicinity of a boundary between the data region 2 and the medium information region 3 are to have intermediate shapes between a shape of the pit P1 and a shape of the pit P2, and this may cause a case where information cannot be properly reproduced. Under the circumstances, it is preferable to provide an intermediate region which is an intended range from the boundary between the data region 2 and the medium information region 3. In this case, in the intermediate region, predetermined information, which does not influence reproduction of information relating to the super-resolution medium 1 and information such as a content, can be recorded by pits P1 and/or pits P2.

EXAMPLE

Figure 6:
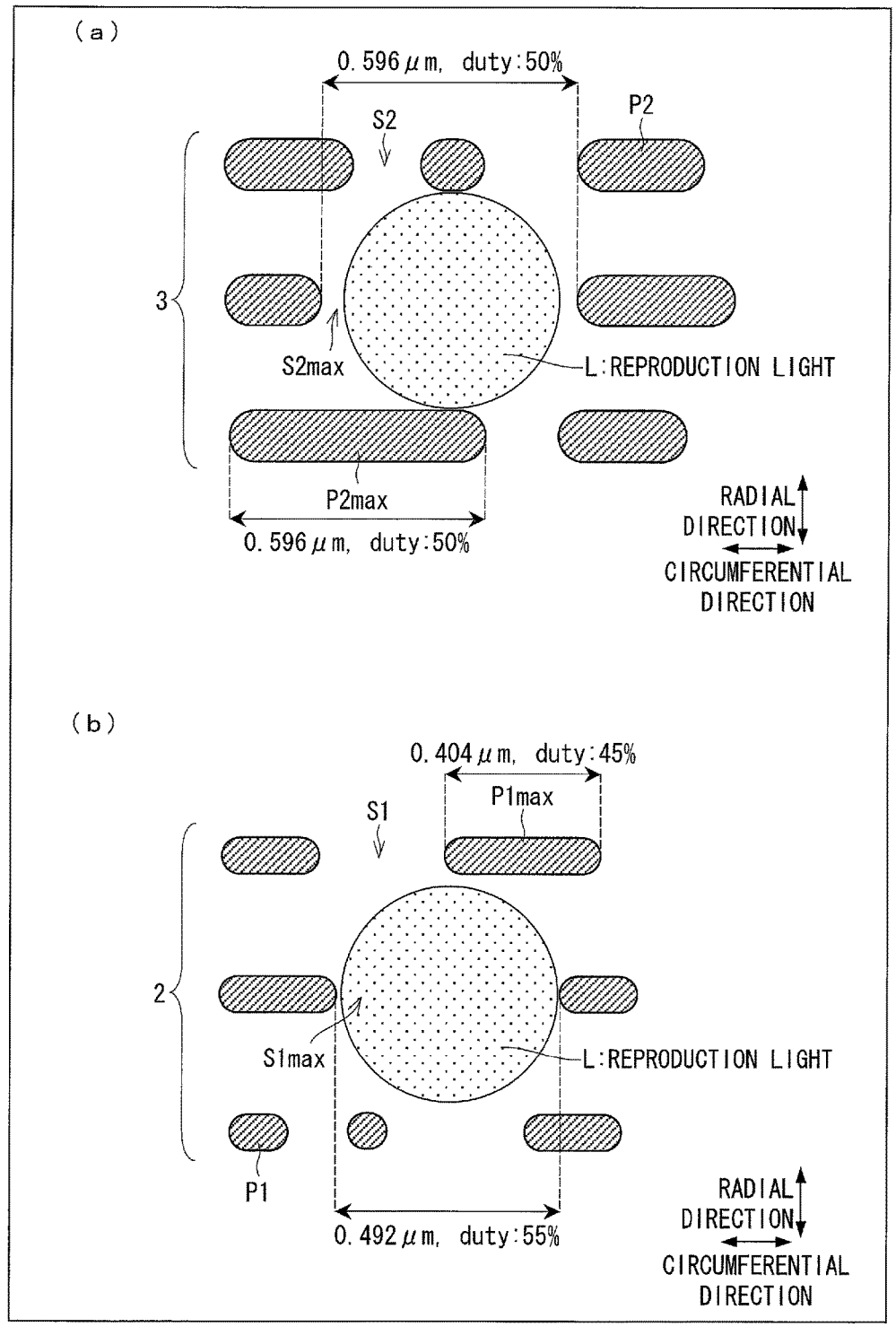
FIG. 6 is a view illustrating an Example of the super-resolution medium, where (a) illustrates a state in which a medium information region is partially (in the vicinity of a longest space) irradiated with reproduction light and (b) illustrates a state in which a data region is partially (in the vicinity of a longest space) irradiated with reproduction light.

Next, the following description will discuss an Example of the super-resolution medium 1 of Embodiment 1, with reference to FIG. 6. FIG. 6 is a view illustrating an Example of the super-resolution medium 1, where (a) illustrates a state in which the medium information region 3 is partially (in the vicinity of the longest space S2max) irradiated with the reproduction light L and (b) illustrates a state in which the data region 2 is partially (in the vicinity of the longest space S1max) irradiated with the reproduction light L.

In this Example, the super-resolution medium 1 has the above described size and includes the layers whose thickness and material have been described above. A track pitch TpR of the medium information region 3 and a track pitch TpD of the data region 2 are 0.32 µm. Note that the track pitch TpR of the medium information region 3 can be 0.35 µm. Moreover, in this Example, information is recorded with the use of the 1-7 PP modulation recording method.

As illustrated in (a) of FIG. 6, in the medium information region 3, the longest pit P2max (pit of 8T) and the longest space S2max (space of 8T) have a length of 0.596 µm. That is, the duty of the pits P2 and the duty of the spaces S2 are both 50%, and the shortest pit P2min (pit of 2T, not illustrated) in the medium information region 3 has the length of 0.149 µm.

On the other hand, as illustrated in (b) of FIG. 6, in the data region 2, the longest pit P1max (pit of 8T) has a length of 0.404 µm and the longest space S1max (space of 8T) has a length of 0.492 µm. That is, the duty of the pits P1 is approximately 45% and the duty of the spaces S1 is approximately 55%, and the shortest pit P1min (pit of 2T, not illustrated) in the data region 2 has a length of 0.101 µm (≈0.112 µm×2×0.45).

Note that the length of 0.112 µm is a length of a shortest pit P101min in a data region 102 in Comparative Example which will be described later. That is, the data region 2 in this Example is obtained by changing the duty in the data region 102 of Comparative Example as above described.

The medium information region 3 has a storage capacity of 25 GB, and the data region 2 has a storage capacity of 33.3 GB (these storage capacities correspond to storage capacities which are obtained in a case where the super-resolution medium 1 is a disk having a diameter of 120 mm).

In a case where a wavelength of reproduction light L (i.e., reproduction light L of a reproduction optical system) that is emitted by the reproduction device which can reproduce the super-resolution medium 1 of Example 1 is $\lambda$ and a numerical aperture of an objective lens included in the reproduction device is NA, the optical system resolution limit of the reproduction device is represented by $\lambda/4NA$. In Example 1, $\lambda$=405 nm and NA=0.85, and the optical system resolution limit is $\lambda/4NA$=0.119 µm (=119 nm).

That is, in the super-resolution medium 1 of Example 1, the data region 2 is a super-resolution region in which at least one pit P1 (space S1) has a length that is shorter than that of the optical system resolution limit (i.e., shorter than 119 nm). Meanwhile, the medium information region 3 is a non-super-resolution region in which all the pits P2 (spaces S2) have lengths which are equal to or longer than that of the optical system resolution limit (i.e., equal to or longer than 119 nm). In other words, the super-resolution medium 1 of Example 1 has the recording layer including (i) the data region 2 in which information is recorded by a first pit row including a pit P1 whose length is shorter than 119 nm and (ii) the medium information region 3 in which information is recorded by a second pit row made up of pits each of which has a length of equal to or longer than 119 nm. The super-resolution medium 1 is reproduced by the reproduction device in which the wavelength $\lambda$ of the reproduction light and the numerical aperture NA of the objective lens are as above described.

Comparative Example

Figure 7:
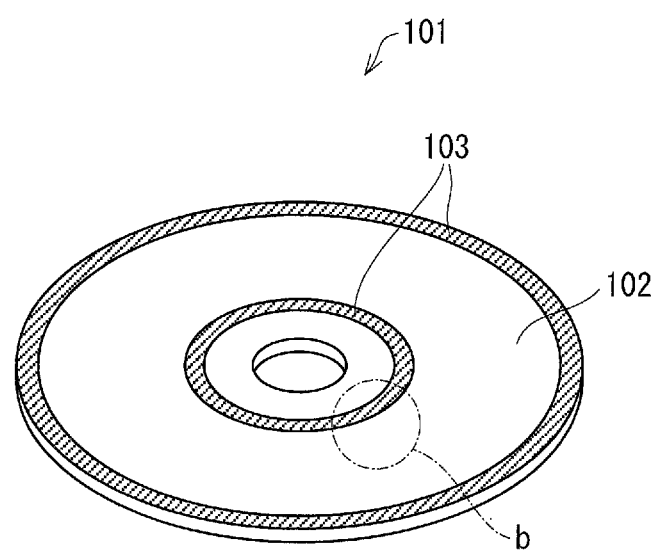
FIG. 7 is a perspective view illustrating an appearance of a super-resolution medium that is a Comparative Example of the super-resolution medium of the present invention.
Figure 8:
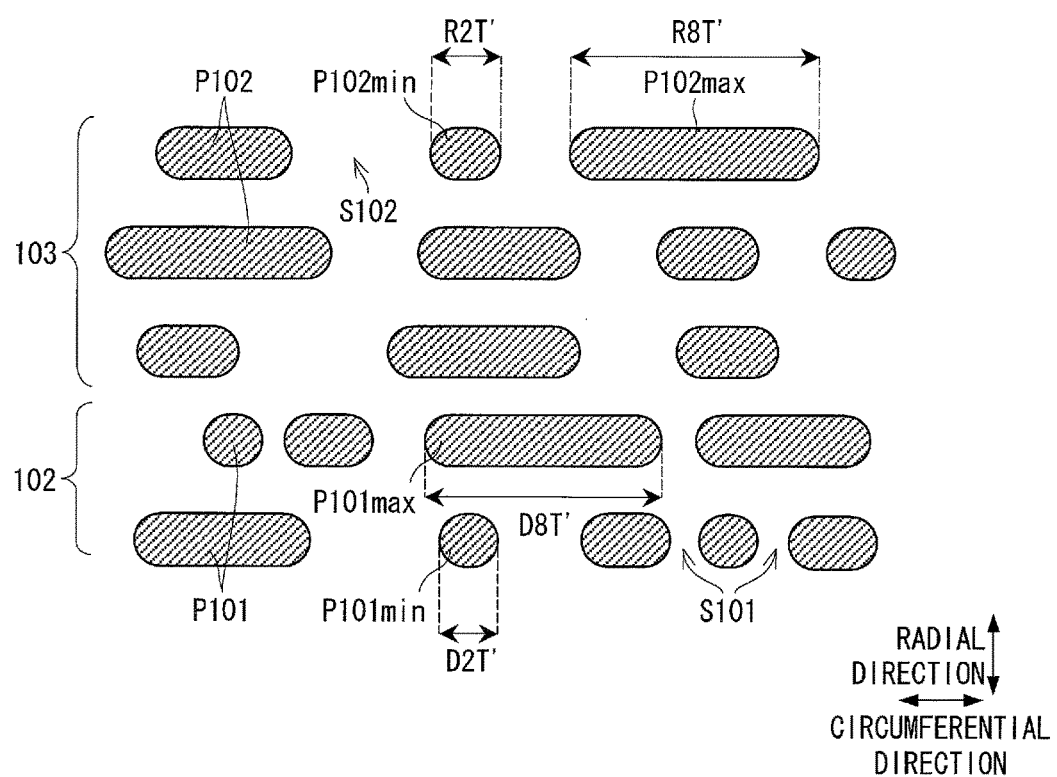
FIG. 8 is a plan view illustrating a configuration of main parts of a substrate included in the super-resolution medium of the Comparative Example.
Figure 9:
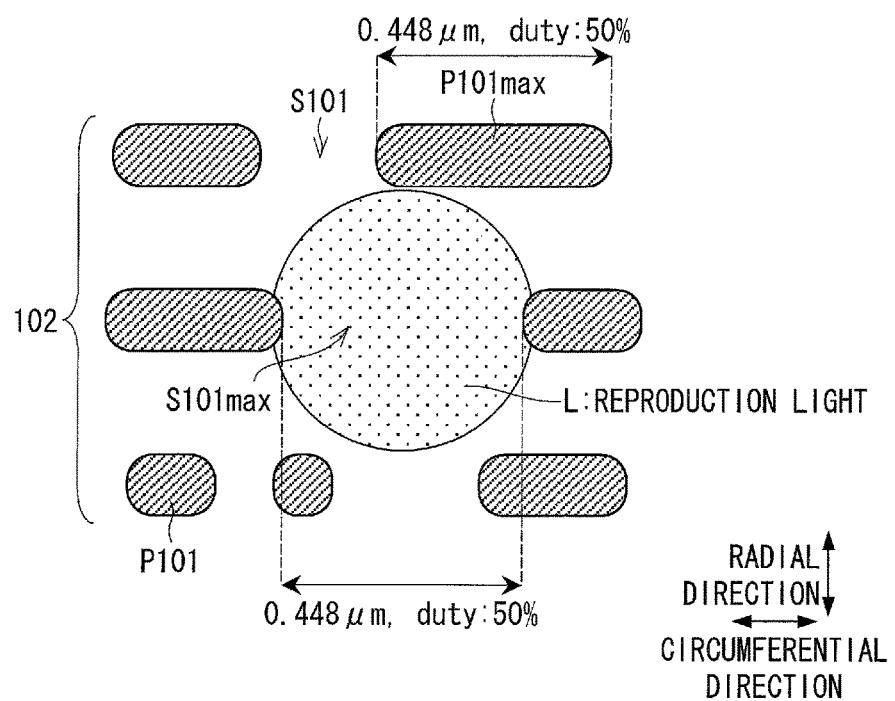
FIG. 9 is a view illustrating a state in which a data region is partially (in the vicinity of a longest space) irradiated with reproduction light L in the super-resolution medium of the Comparative Example.

The following description will discuss a super-resolution medium 101 as Comparative Example of Embodiment 1, with reference to FIGS. 7 through 9. FIG. 7 illustrates an appearance of the super-resolution medium 101, and FIG. 8 is an enlarged view of a part b of the super-resolution medium 101. FIG. 9 illustrates a state in which a data region 102 is partially (in the vicinity of a longest space S101max) irradiated with reproduction light L. Note that a reproduction device for reproducing the super-resolution medium 101 is the one which is used in Example 1.

The super-resolution medium 101 has a fundamental structure which is similar to that of the super-resolution medium 1, except that shapes of pits P101 (spaces S101) in the data region 102 are different from those of the pits P1 (spaces S1) in the data region 2. That is, shapes and an arrangement of pits P102 in the medium information region 103 are identical with shapes and the arrangement of the pits P2 illustrated in (a) of FIG. 6, and "R2T" and "R8T" in FIG. 8 correspond to "R2T" and "R8T", respectively.

Specifically, as illustrated in FIG. 7, the super-resolution medium 101 includes in advance (i) the data region 102 in which a content is recorded and (ii) the medium information region 103 in which information relating to the super-resolution medium 101 is recorded, as with the super-resolution medium 1. Moreover, as illustrated in FIG. 8, the plurality of pits P101 and the plurality of spaces S102 provided between the plurality of pits P101 are formed in the data region 102 so as to be arranged in rows in a circumferential direction at a predetermined track pitch, and the plurality of pits P102 and the plurality of spaces S102 provided between the plurality of pits P102 are formed in the medium information region 103 so as to be arranged in rows in the circumferential direction at a predetermined track pitch.

In the data region 102, a shortest pit P101min (pit of 2T, not illustrated) has a length D2T' of 0.112 µm and, as illustrated in FIG. 9, a longest pit P101max (pit of 8T) has a length D8T' of 0.448 µm. Moreover, a longest space S101max (space of 8T) also has a length of 0.448 µm. That is, in this Comparative Example, a duty of the pits P101 and a duty of the spaces S101 are both 50%. Note that the data region 2 has a storage capacity of 33.3 GB (which corresponds to a storage capacity obtained in a case where the super-resolution medium 101 is a disk having a diameter of 120 mm).

Comparison with Comparative Example

In the super-resolution medium 101 of Comparative Example, not only the spaces S101 but also the pits P101 are partially irradiated with the reproduction light L as illustrated in FIG. 9. That is, a reflectance obtained by the reproduction device is decreased by a degree that corresponds to an amount of the reproduction light L with which the pits P101 are irradiated. From this, the reflectance is lower than a reflectance that is obtained from the longest space S102max (not illustrated) in the medium information region 103, and it therefore becomes necessary to repeatedly carry out focus control during the sequential reproduction, depending on circumstances.

On the other hand, in the super-resolution medium 1 of the above described Example, the duties (i.e., the length of the pit P1 and the length of the space S1) in the data region 2 are as described above. That is, the duty of the pits P1 in the data region 2 is smaller than the duty of the pits P101 in the data region 102 and, as illustrated in (b) of FIG. 6, the length of the longest space S1max is longer than the irradiation region formed by the reproduction light L.

As such, in the super-resolution medium 1, the pits P1 present around the longest space S1max are not irradiated with the reproduction light L, and therefore the reproduction device can deal with the reflectance obtained from the longest space S1max in the data region 2 as being identical with the reflectance obtained from the longest space S2max in the medium information region 3. Therefore, according to the super-resolution medium 1, it is possible to promptly and surely reproduce, during the sequential reproduction, pieces of information which are recorded in separate regions.

Experiment Example

Next, the following description will discuss an Experiment Example relating to the super-resolution medium 1 of Embodiment 1, with reference to FIG. 10 and FIG. 11. FIGS. 10 and 11 illustrate results of experiments carried out in the Experiment Example relating to the super-resolution medium 1. In this Experiment Example, appropriate lengths (duty) of the pits P1 and the spaces S1 in the data region 2 are verified. Note, however, that the results of verification are merely an example, and a tolerance thereof can be changed in accordance with a reproduction status.

FIG. 10 shows results of measuring reflectances obtained from optical information recording mediums "Pit group A" through "Pit group D" which are different in pit length. The measurement is carried out with a BD standard evaluation device (ODU-1000 (λ: 405 nm, NA: 0.85) manufactured by PULSTEC INDUSTRIAL CO., LTD.), and a reproduction light intensity is 1.0 mW in the measurement.

In FIG. 10, "Pit group A" is an optical information recording medium including a non-super-resolution region which is made up of only pits whose lengths are equal to or longer than that of an optical system resolution limit. A shortest pit in "Pit group A" has a length of 0.149 µm (with the duty of 50%).

Each of "Pit group B" through "Pit group D" is an optical information recording medium which includes a super-resolution region having at least one pit whose length is shorter than that of the optical system resolution limit. A length of a shortest pit in each of "Pit group B" through "Pit group D" is 0.112 µm (with the duty of 50%).

"Pit group B", "Pit group C", and "Pit group D" are different in pit length and space length (i.e., duties of pit and space), and the pit lengths (duty of pits) decrease in this order. The duties of pits in the respective optical information recording mediums are as follows:

"Pit group B" . . . 51.7% (duty of spaces is 48.3%)
"Pit group C" . . . 50.3% (duty of spaces is 49.7%)
"Pit group D" . . . 48.8% (duty of spaces is 51.2%)

Moreover, each of the optical information recording mediums is configured by sequentially laminating, on a substrate, (i) a functional layer which is made of tantalum and has a thickness of 12 nm and (ii) a cover layer which is made up of a polycarbonate film and a transparent adhesive material and has a thickness of 100 µm. Further, in each of the optical information recording mediums, information is recorded with the 1-7 PP modulation recording method. That is, a length of a shortest pit (shortest space) is 2T, and a length of a longest pit (longest space) is 8T.

In order for the reproduction device to stably carry out focus control, it is necessary to form the longest pit and the longest space so that a reflectance in each of the optical information recording mediums falls within a predetermined range in which the focus control can be carried out. The predetermined range can be considered as a tolerance of reflectance which is (i) obtained from each of the optical information recording mediums and (ii) dealt with by the reproduction device as an identical reflectance. In a case of the super-resolution medium 1 of Embodiment 1, it is possible to rephrase the predetermined range as a predetermined error range which encompasses both the reflectance obtained from the data region 2 and the reflectance obtained from the medium information region 3. Further, it is possible to consider that two reflectances are substantially identical with each other, provided that the two reflectances fall within the predetermined range.

The predetermined range is preferably within approximately ±5% relative to a predetermined criterion, by taking into consideration factors such as (1) deformation of the substrate caused during manufacturing, (2) film thickness distribution in the substrate, the information recording layer made up of the functional layer and the reflection film, or the cover layer, (3) unevenness in manufacturing of a light source, a detecting device (detector), and the like included in the reproduction device, and (4) measurement errors between the optical information recording mediums in focusing.

As above described, the longest space in the non-super-resolution medium is larger than the irradiation region formed by reproduction light on the non-super-resolution medium. From this, the predetermined criterion is preferably a reflectance obtained by irradiating the longest space of the non-super-resolution medium. That is, in a case where the super-resolution region (data region 2) and the non-super-resolution region (medium information region 3) are provided as in the super-resolution medium 1, a reflectance to be measured is preferably within approximately ±5% relative to a criterion which is a reflectance of the non-super-resolution region.

In this Experiment Example, as illustrated in FIG. 10, the predetermined range (tolerance of reflectance) is set to 10.03% or higher and 11.12% or lower, on the basis of the predetermined criterion which is a reflectance (10.56%) of the "Pit group A".

As illustrated in FIG. 10, reflectances of "Pit group B", "Pit group C", and "Pit group D" are "9.51%", "10.27%", and "10.52%", respectively, as a result of measurement. Moreover, the reflectances of "Pit group C" and "Pit group D" are merely slightly different from the reflectance of "Pit group A", and fall within the predetermined range.

From the measurement results, it can be seen that the duty of spaces becomes larger (i.e., length of space becomes longer) as the duty of pits becomes smaller (i.e., length of pit becomes shorter), and accordingly the reflectance obtained by irradiating the longest space (space of 8T) increases. Moreover, the reflectances of respective of "Pit group C" and "Pit group D" fall within the predetermined range, and it is therefore possible to consider that these reflectances and the reflectance of "Pit group A" can be dealt with by the reproduction device as identical reflectances.

Therefore, in the super-resolution medium 1, as the lengths of pits P1 in the data region 2 which is the super-resolution region are set to be shorter, the reflectance obtained from the data region 2 is more likely to be dealt with by the reproduction device as being identical with the reflectance obtained from the medium information region 3 which is the non-super-resolution region. That is, even in sequential reproduction across the data region 2 and the medium information region 3 which are different in information recording density, it is possible to stably reproduce information without causing, in information reproduction, a trouble such as being out-of-focus caused due to difference in reflectance.

Next, FIG. 11 shows results of measuring i-MLSE (Integrated-Maximum Likelihood Sequence Error Estimation) indicative of reproduction signal quality of optical information recording mediums "Pit group B", "Pit group C", and "Pit group D".

In order to inhibit an error in reproduction and to quickly reproduce information, it is necessary to obtain good reproduction signal quality and, in general, a value of i-MLSE needs to be 15.5% or lower.

As illustrated in FIG. 11, the values of i-MLSE of "Pit group B", "Pit group C", and "Pit group D" are "10.0%", "10.5%", and "15.2%", respectively. From these measurement results, it can be seen that good reproduction of information can be carried out even in a case where the shapes of the pits P1 in the super-resolution medium 1 are changed so that the duty of the pits P1 becomes different from the duty of pits in the general super-resolution medium. That is, it can be seen that the reproduction signal quality of the general super-resolution medium is maintained also in the super-resolution medium 1.

Moreover, from the measurement results of FIG. 10 and FIG. 11, it can be seen that "Pit group C" and "Pit group D" are preferably applied to the data region 2 of the super-resolution medium 1. That is, it can be seen that, in a case where the 1-7 PP modulation recording method is employed and even in a case where the duty of the pits P1 is larger than the duty of the spaces in the data region 2, it is sufficient that the duty of the pits P1 is smaller than the duty of the pits in the general super-resolution medium (the duty of the pits in the general super-resolution medium is not necessarily 50%). From this, according to the super-resolution medium 1 having the data region 2 and the medium information region 3 which are different in information recording density, it is possible to cause the reproduction device to deal with the reflectance obtained from the data region 2 as being identical with the reflectance obtained from the medium information region 3, and it is also possible to properly reproduce information by the reproduction device.

Embodiment 2

Figure 12:
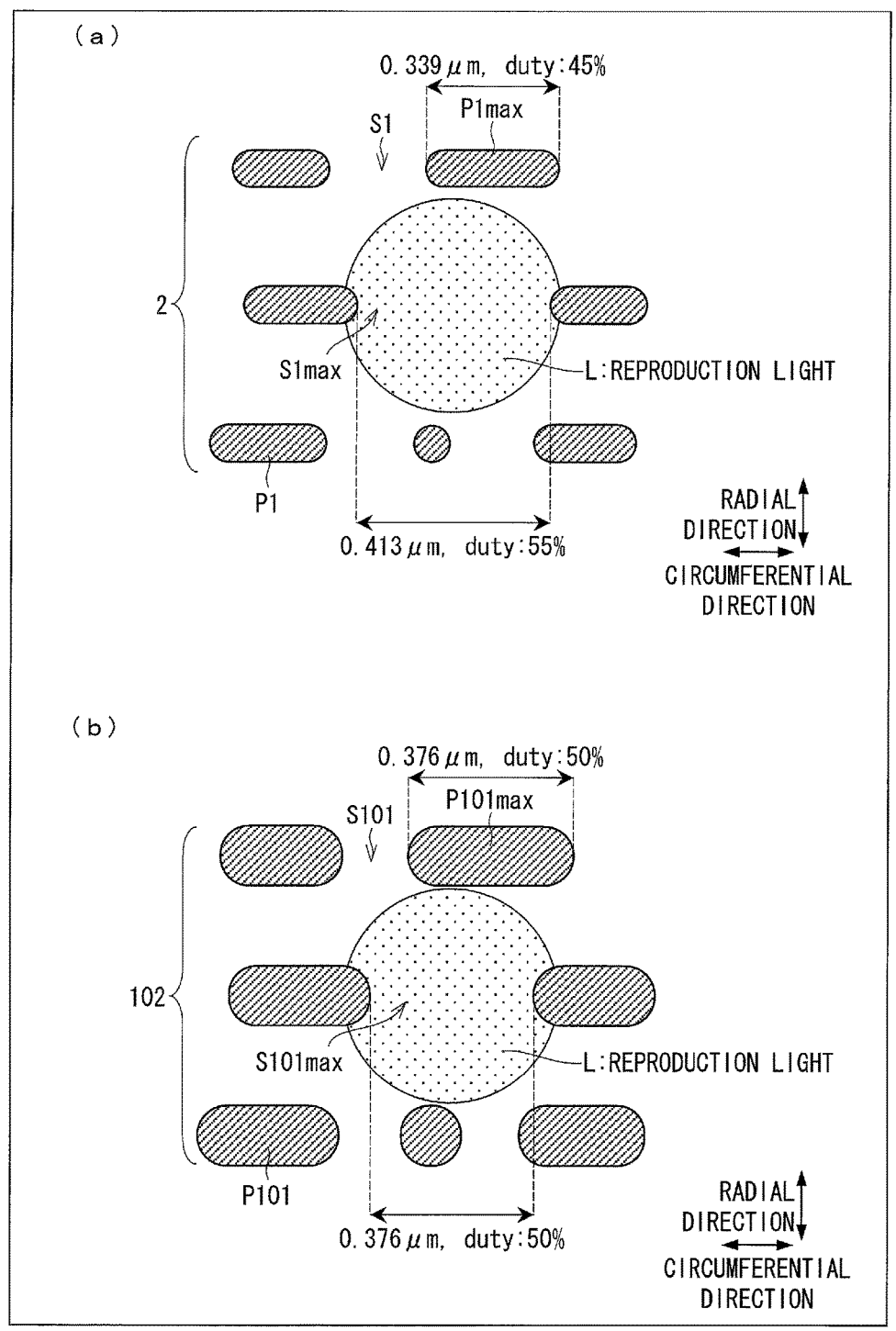
FIG. 12 is a view illustrating an Example of a super-resolution medium in accordance with another embodiment of the present invention and a Comparative Example of the super-resolution medium, where (a) illustrates a state in which a data region is partially (in the vicinity of a longest space) irradiated with reproduction light in the Example and (b) illustrates a state in which a data region is partially (in the vicinity of a longest space) irradiated with reproduction light L in the Comparative Example.
Figure 13:
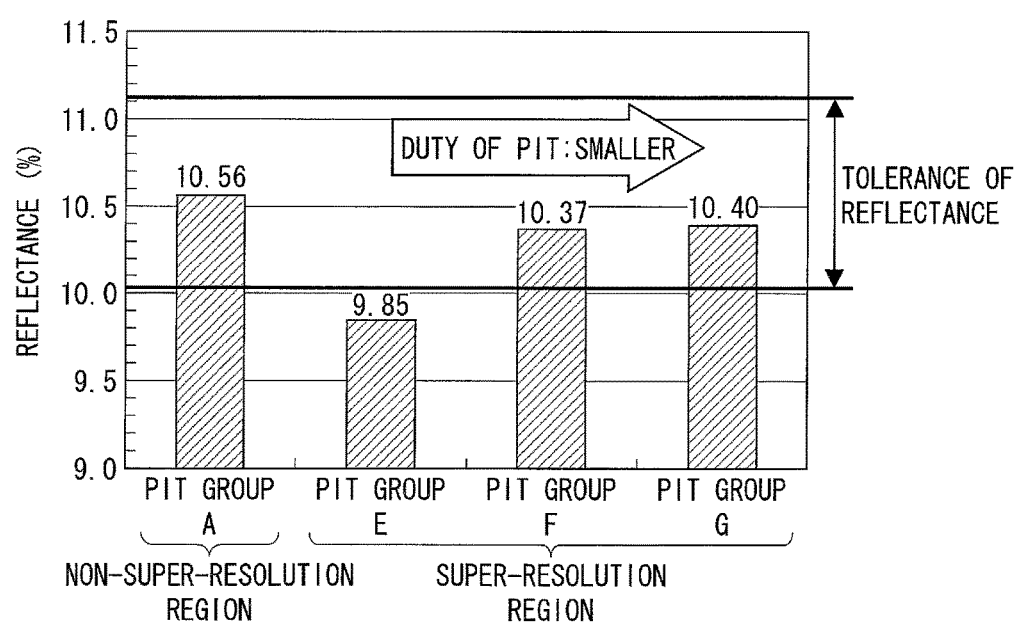
FIG. 13 is a view illustrating an experiment result of an Experiment Example in relation to the super-resolution medium.

The following description will discuss another embodiment of the present invention with reference to FIGS. 12 and 13. For convenience of explanation, identical reference numerals are given to members having functions identical to those described in Embodiment 1, and descriptions of such members are omitted in Embodiment 2.

A super-resolution medium 1 of Embodiment 2 is different from that of Embodiment 1 in that lengths of pits P1 and spaces S1 in Embodiment 2 are shorter than those of corresponding pits P1 and spaces S1 in Embodiment 1. The other configurations (e.g., pit shapes in the medium information region 3, and the like) are identical with those in Embodiment 1.

In this case, a length of a longest space S1max is shorter than a diameter of an irradiation region formed by reproduction light L on the super-resolution medium 1. Therefore, in a case where the longest space S1max is irradiated with the reproduction light L, pits P1 which are present around the longest space S1max are also partially irradiated, and an obtained reflectance is decreased by a degree that corresponds to an amount of the reproduction light L with which the pits P1 are partially irradiated.

However, even in this case, it is sufficient to form the pits P1 so that a reflectance obtained from the longest space S1max can be dealt with by the reproduction device as being identical with a reflectance that is obtained from a longest space S2max (see (a) of FIG. 6). From this, even in a case where the length of the longest space S1max is shorter than the diameter of the irradiation region formed by the reproduction light L, it is possible to reproduce information without causing out-of-focus during the sequential reproduction.

Example

Next, the following description will discuss an Example of the super-resolution medium 1 of Embodiment 2, with reference to FIG. 12. (a) of FIG. 12 illustrates a state in which a data region 2 is partially (in the vicinity of a longest space S1max) irradiated with reproduction light L in the Example of the super-resolution medium 1 of Embodiment 2.

Note that a state in which the medium information region 3 in the super-resolution medium 1 of Embodiment 2 is irradiated with reproduction light L is identical with that illustrated in (a) of FIG. 6. Moreover, configurations other than those described below are identical with the configurations of the Example in Embodiment 1. Therefore, such configurations will not be repeatedly described in detail.

In this Example, as illustrated in (a) of FIG. 12, the data region 2 includes a longest pit P1max (pit of 8T) whose length is 0.339 μm and a longest space S1max (space of 8T) whose length is 0.413 μm. That is, a duty of the pits P1 is approximately 45%, and a duty of the spaces S1 is approximately 55%, and a shortest pit P1min (pit of 2T, not illustrated) in the data region 2 has a length of approximately 0.085 μm (≈0.094 μm×2×0.45).

Note that the length of 0.094 μm is a length of a shortest pit P101min in a data region 102 in Comparative Example which will be described later. That is, the data region 2 in this Example is obtained by changing, as above described, the duty in the data region 102 of Comparative Example.

In the data region 2 of this Example, a track pitch TpD is 0.32 μm, and a storage capacity is 40 GB (which corresponds to a storage capacity obtained in a case where the super-resolution medium 1 is a disk having a diameter of 120 mm). That is, as compared with Example of Embodiment 1, the lengths of the pits P1 and the lengths of the spaces S1 are shorter, and therefore the storage capacity is increased. Moreover, the length of the longest space S1max is shorter than the diameter of the irradiation region formed by the reproduction light L.

Comparative Example (b) of FIG. 12 illustrates a state in which a data region 102 is partially (in the vicinity of a longest space S101max) irradiated with reproduction light L in a super-resolution medium 101 which is Comparative Example of the super-resolution medium 1 of Embodiment 2.

Note that a state in which the medium information region 103 in Comparative Example is irradiated with reproduction light L is identical with that illustrated in (a) of FIG. 6. Moreover, configurations other than those described below are identical with the configurations of the Comparative Example in Embodiment 1. Therefore, such configurations will not be repeatedly described in detail.

In the super-resolution medium 101 of Comparative Example of Embodiment 2, a length of a shortest pit P101min (pit of 2T, not illustrated) in the data region 2 is 0.094 μm, and a track pitch TpD in the data region 2 is 0.32 μm.

As illustrated in (b) of FIG. 12, in the data region 102, a length of a longest pit P1max (pit of 8T) and a length of a longest space S1max (space of 8T) are both 0.376 μm. That is, a duty of the pits P101 and a duty of the spaces S101 are both 50%. Note that the data region 2 has a storage capacity of 40 GB (which corresponds to a storage capacity obtained in a case where the super-resolution medium 101 is a disk having a diameter of 120 mm).

Comparison with Comparative Example

As illustrated in (a) and (b) of FIG. 12, pits P1 are partially irradiated with the reproduction light L with which the space S1max is irradiated in Example, and pits P101 are partially irradiated with the reproduction light L with which the space S101max is irradiated in Comparative Example. Therefore, a reflectance obtained by the reproduction device is decreased by a degree that corresponds to an amount of the reproduction light L with which the pits P1 or P101 are irradiated.

On the other hand, a size of the pit P1 in Example is smaller than that of the pit P101 which (i) is of Comparative Example and (ii) corresponds to the pit P1. That is, the duty of the pits P1 in Example is smaller than the duty of the pits P101 in Comparative Example. Therefore, a ratio of a part of the pits P1 which part accounts for the irradiation region formed by the reproduction light L in Example is smaller than a ratio of a part of the pits P101 which part accounts for the irradiation region formed by the reproduction light L in Comparative Example.

This makes it possible to enhance the reflectance obtained from the longest space S1max in the data region 2 of Example, as compared with Comparative Example. Further, in this Example, the reflectance obtained from the longest space S1max in the data region 2 can be dealt with by the reproduction device as being identical with the reflectance obtained from the longest space S2max in the medium information region 3.

As such, according to the super-resolution medium 1, it is possible to promptly and surely reproduce, during the sequential reproduction, pieces of information which are recorded in separate regions, as with Embodiment 1, even in a case where the length of the longest space S1max is shorter than the diameter of the irradiation region formed by the reproduction light L.

Moreover, the pits P1 are smaller than those of Embodiment 1, and it is therefore possible to increase a storage capacity of the data region 2.

Experiment Example

Next, the following description will discuss an Experiment Example relating to the super-resolution medium 1 of Embodiment 2, with reference to FIG. 13. FIG. 13 illustrates results of experiment carried out in an Experiment Example relating to the super-resolution medium 1. In this Experiment Example, appropriate lengths (duty) of the pits P1 and the spaces S1 in the data region 2 are verified. Note, however, that the results of verification are merely an example, and a tolerance thereof can be changed in accordance with a reproduction status.

Note that an evaluation device used in this Experiment Example is identical with the evaluation device used in Experiment Example of Embodiment 1. Moreover, optical information recording mediums "Pit group E" through "Pit group G" have structures similar to those of the optical information recording mediums "Pit group B" through "Pit group D" employed in Experiment Example of Embodiment 1, except for shapes of pits. Therefore, such structures will not be repeatedly described in detail.

FIG. 13 shows results of measuring reflectances obtained from optical information recording mediums "Pit group A" and "Pit group E" through "Pit group G" which are different in pit length. The measurement is carried out with a BD standard evaluation device and a reproduction light intensity is 1.0 mW in the measurement.

In FIG. 13, "Pit group E" through "Pit group G" are optical information recording mediums each including a super-resolution region which has at least one pit whose length is shorter than that of an optical system resolution limit. A length of a shortest pit in each of "Pit group E" through "Pit group G" is 0.094 μm (with the duty of 50%).

"Pit group E", "Pit group F", and "Pit group G" are different in pit length and space length (i.e., duties of pit and space), and the pit lengths (duty of pits) decrease in this order. Moreover, in each of the "Pit group E" through "Pit group G", in a case where a longest space is irradiated with reproduction light L, pits which are present around the longest space are also partially irradiated with the reproduction light L.

As illustrated in FIG. 13, reflectances of "Pit group E", "Pit group F", and "Pit group G" are "9.85%", "10.37%", and "10.40%", respectively, as a result of measurement. Moreover, the reflectances of "Pit group F" and "Pit group G" are merely slightly different from the reflectance of "Pit group A", and fall within the predetermined range.

From the measurement results, it can be seen that the duty of spaces becomes larger as the duty of pits becomes smaller, and accordingly the reflectance obtained by irradiating the longest space (space of 8T) increases. Moreover, the reflectances of respective of "Pit group F" and "Pit group G" fall within the predetermined range, and it is therefore possible to consider that these reflectances and the reflectance of "Pit group A" can be dealt with by the reproduction device as identical reflectances.

Therefore, in the super-resolution medium 1, as the lengths of the pits P1 in the data region 2 which is the super-resolution region are set to be shorter, the reflectance obtained from the data region 2 are more likely to be dealt with by the reproduction device as being identical with the reflectance obtained from the medium information region 3 which is the non-super-resolution region.

Moreover, even in a case where a size of the pits P1 is made smaller than that in Example of Embodiment 1 and consequently the pits P1 are irradiated with reproduction light L with which the longest space S2max is irradiated, it is possible to deal with the reflectance by the reproduction device as above described, by setting the duty of the pits P1 to be smaller. That is, it is possible to enlarge a storage capacity of the super-resolution medium 1.

Embodiment 3

Figure 15:
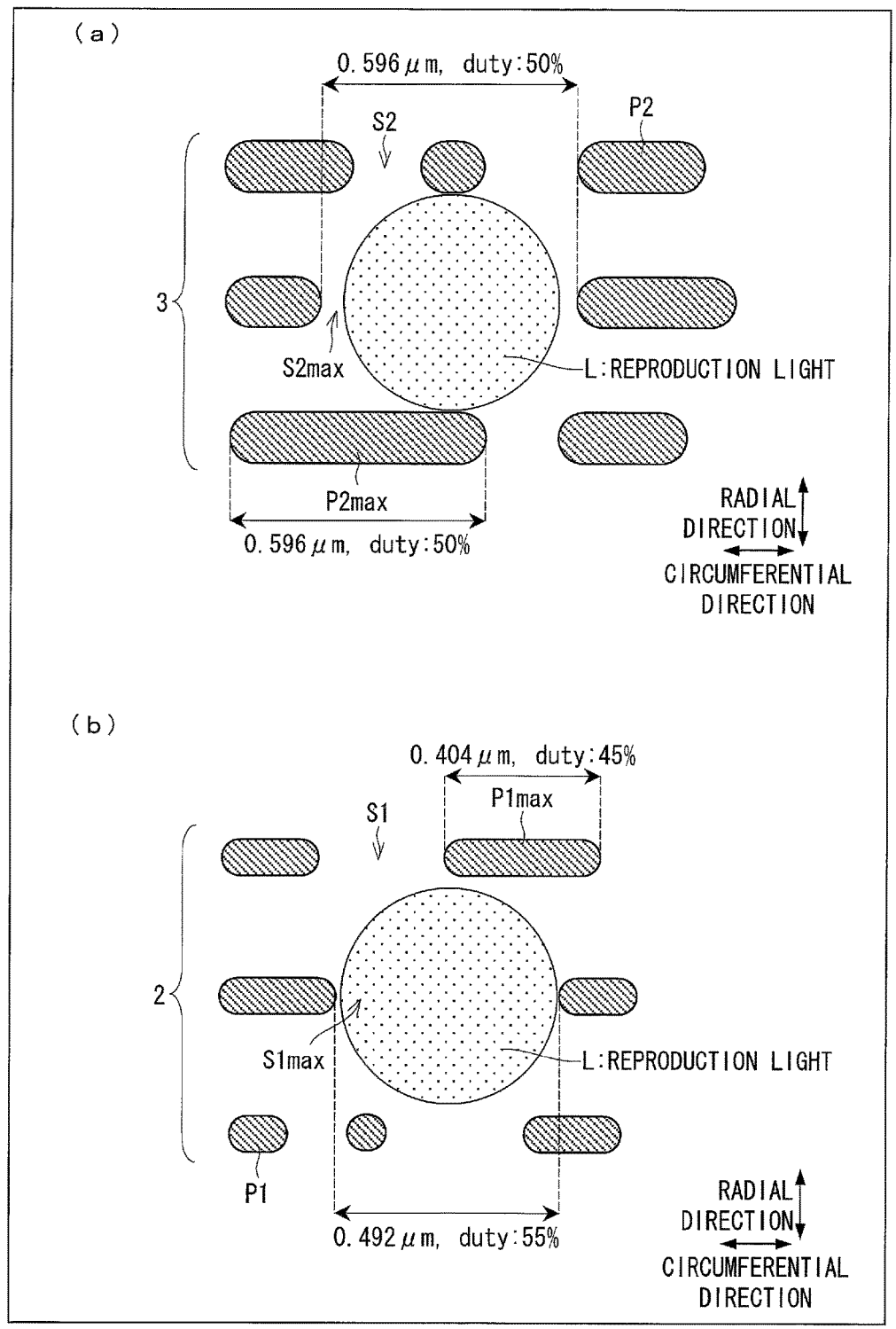
FIG. 15 is a view illustrating an Example of the super-resolution medium, where (a) illustrates a state in which a medium information region is partially (in the vicinity of a longest space) irradiated with reproduction light and (b) illustrates a state in which a data region is partially (in the vicinity of a longest space) irradiated with reproduction light.

The following description will discuss another embodiment of the present invention with reference to FIGS. 14 and 15. For convenience of explanation, identical reference numerals are given to members having functions identical to those described in Embodiments 1 and 2, and descriptions of such members are omitted in Embodiment 3.

FIG. 14 illustrates a polarity of pits P1 and P2. As illustrated in FIG. 14, the super-resolution medium 1 of Embodiment 3 is different from that of Embodiment 1 (in-pit form) in that pits P1 and P2 having a convex shape are formed on a substrate 4 (i.e., formed in an on-pit form). The other configurations are identical with those of Embodiment 1.

Example

Next, the following description will discuss an Example of the super-resolution medium 1 of Embodiment 3, with reference to FIG. 15. FIG. 15 is a view illustrating an Example of the super-resolution medium 1, where (a) illustrates a state in which a medium information region 3 is partially (in the vicinity of a longest space S2max) irradiated with reproduction light L and (b) illustrates a state in which a data region 2 is partially (in the vicinity of a longest space S1max) irradiated with reproduction light L.

The super-resolution medium 1 in this Example has configurations similar to those in the Example illustrated in FIG. 6, except that the pits P1 and P2 have a convex shape. According to the arrangement, in a case where the longest space S2max in the medium information region 3 is irradiated with the reproduction light L, the pits P2 will not be irradiated with the reproduction light L (see (a) of FIG. 15). Moreover, in a case where the longest space S1max in the data region 2 is irradiated with the reproduction light L, the pits P1 will not be irradiated with the reproduction light L, unlike a general super-resolution medium (see (b) of FIG. 15).

Therefore, according to the super-resolution medium 1 in which the pits P1 and P2 have the convex shape, the reproduction device can deal with a reflectance obtained from the longest space S1max in the data region 2 as being identical with a reflectance obtained from the longest space S2max in the medium information region 3, as with Embodiment 1.

Embodiment 4

The following description will discuss yet another embodiment of the present invention, with reference to FIG. 16. For convenience of explanation, identical reference numerals are given to members having functions identical to those described in Embodiments 1 through 3, and descriptions of such members are omitted in Embodiment 4.

A super-resolution medium 1 of Embodiment 4 is different from that of Embodiment 2 in that a data region 2 in Embodiment 4 has a narrower track pitch TpD.

Example

Next, the following description discusses an Example of the super-resolution medium 1 of Embodiment 4, with reference to FIG. 16. FIG. 16 is a view illustrating a state in which the data region 2 is partially (in the vicinity of a longest space S1max) irradiated with reproduction light L.

Note that a state in which a medium information region 3 in the super-resolution medium 1 of Embodiment 4 is irradiated with reproduction light L is identical with that illustrated in (a) of FIG. 6. Moreover, configurations other than those described below are identical with the configurations of the Example in Embodiment 2. Therefore, such configurations will not be repeatedly described in detail.

In the data region 2 of this Example, a longest pit P1max (pit of 8T) has a length of 0.301 μm and the longest space S1max (space of 8T) has a length of 0.451 μm (see FIG. 16). That is, a duty of pits P1 is approximately 40% and a duty of spaces S1 is approximately 60%, and a shortest pit P1min (pit of 2T, not illustrated) in the data region 2 has a length of approximately 0.075 μm (≈0.094 μm×2×0.40).

Note that, as described in the Example of Embodiment 2, the length of 0.094 μm is the length of the shortest pit P101min in the data region 102 of the Comparative Example in Embodiment 2. That is, the data region 2 in this Example is obtained by changing the duty in the data region 102 of the Comparative Example of Embodiment 2 as described above.

Further, in this Example, the track pitch TpD of the data region 2 is 0.29 μm, and the data region 2 has a storage capacity of 44 GB (which corresponds to a storage capacity obtained in a case where the super-resolution medium 1 is a disk having a diameter of 120 mm).

That is, as compared with the Example of Embodiment 2, the lengths of the pits P1 and the lengths of the spaces S1 are shorter, and therefore the storage capacity is further increased. Moreover, the length of the longest space S1max is shorter than the diameter of the irradiation region formed by the reproduction light L on the super-resolution medium 1.

Comparative Example

A super-resolution medium 101 of a Comparative Example of this Example is identical in structure with that of the Comparative Example in Embodiment 2, and therefore descriptions for the super-resolution medium 101 are omitted here. Note that a state is illustrated in (b) of FIG. 12 in which a data region 102 of the super-resolution medium 101 is partially (in the vicinity of S101max) irradiated with reproduction light L. Note that the track pitch of the data region 102 is 0.32 μm.

Comparison with Comparative Example

As with Embodiment 2, a size of the pit P1 in Example is smaller than that of the pit P101 which (i) is of Comparative Example and (ii) corresponds to the pit P1. Further, since the track pitch TpD is made narrower in Example, pits P1 of adjacent tracks may also be irradiated with the reproduction light L with which the longest space S1max is irradiated. In this case, therefore, a reflectance may decrease. In order to avoid this, in this Example, the duty of the pits P1 is made further smaller than that of the Example in Embodiment 2.

This makes it possible to prevent the pits P1 of the adjacent tracks from being irradiated with the reproduction light L, and it is therefore possible to eliminate influence, which occurs due to the shortening of the track pitch TpD, on a reflectance to be measured.

Further, as with Embodiment 2, even if the pits P1 which are on a track on which the longest space S1max is provided are partially irradiated with the reproduction light L with which the longest space S1max is irradiated, the reflectance obtained from the data region 2 can be dealt with by the reproduction device as being identical with the reflectance obtained from the medium information region 3, because the irradiated part of the pits P1 can be made smaller than that in Comparative Example.

As described above, the track pitch TpD and the sizes of the pits P1 in the data region 2 of Example are smaller than the track pitch and the sizes of the pits P101 of Comparative Example, so that the number of track pitches and the number of pits become larger in Example as compared with Comparative Example. This makes it possible to increase a storage capacity as compared with Comparative Example. Further, the track pitch TpD and the pits P1 in this Example are smaller than those in the Example of Embodiment 2, and it is therefore possible to further increase the storage capacity.

Modification Examples of Super-Resolution Medium 1 of Embodiments 1 Through 4

A shape of the pits P1 is not limited to the one described above, provided that (1) it is possible to cause the production device to deal with the reflectance obtained from the data region 2 as being identical with the reflectance obtained from the medium information region 3 and (2) it is possible to properly reproduce information by the reproduction device.

For example, it is possible that (i) only the duty of the longest pit P1max is smaller than that of a longest pit of a general super-resolution medium and (ii) the duty of the other pits P1 is identical with that of pits of the general super-resolution medium. That is, it is possible that only the duty of the longest space S1max is greater than that of a longest space of the general super-resolution medium.

Generally, a shortest pit (shortest space) or a pit equivalent to the shortest pit (a space equivalent to the shortest space) accounts for most of influence on reproduction signal quality, and a longest pit or a longest space hardly exerts influence on the reproduction signal quality. Note that, in a case where the 1-7 PP modulation recording method is employed, the shortest pit is a pit of 2T, a pit equivalent to the shortest pit is a pit of 3T, the shortest space is a space of 2T, and a pit equivalent to the shortest space is a space of 3T.

Thus, by making only the duty of the longest pit or of the longest space smaller than that of the general super-resolution medium, it is possible to further improve the reproduction signal quality, i.e., it is possible to more properly reproduce information.

Further, it is possible that the pits P1 have (i) a width smaller than that of the pits of the general super-resolution medium and/or (ii) a depth shallower than that of the pits of the general super-resolution medium, while the duty of the pits P1 is identical with that of the pits of the general super-resolution medium.

In a case where the duty of the pits P1 is identical with that of the pits of the general super-resolution medium, for example, pits P1 that are present in the vicinity of the longest space S1max are also partially irradiated with the reproduction light L with which the longest space S1max is irradiated.

However, in a case where the pits P1 have a small width, it is possible to reduce a ratio of a part of the pits P1 which part accounts for the irradiation region formed by the reproduction light L, as compared with a case of the general super-resolution medium. In a case where the pits P1 have a shallow depth, it is possible to approximate a reflectance obtained from the part of the pits P1 to that obtained from the longest space S1max, as compared with a case of the general super-resolution medium.

Therefore, in any of the above cases, it is possible to (i) approximate the reflectance obtained from the data region 2 to a value of the reflectance obtained from the medium information region 3 and (ii) cause the reproduction device to deal with the reflectance obtained from the data region 2 as being identical with the reflectance obtained from the medium information region 3.

That is, it is only necessary that a shape of the pits P1 is set so that a size of the longest space S1max, which size substantially determines a reflectance in the data region 2, satisfies the above conditions (1) and (2).

Embodiment 5

Figure 18:
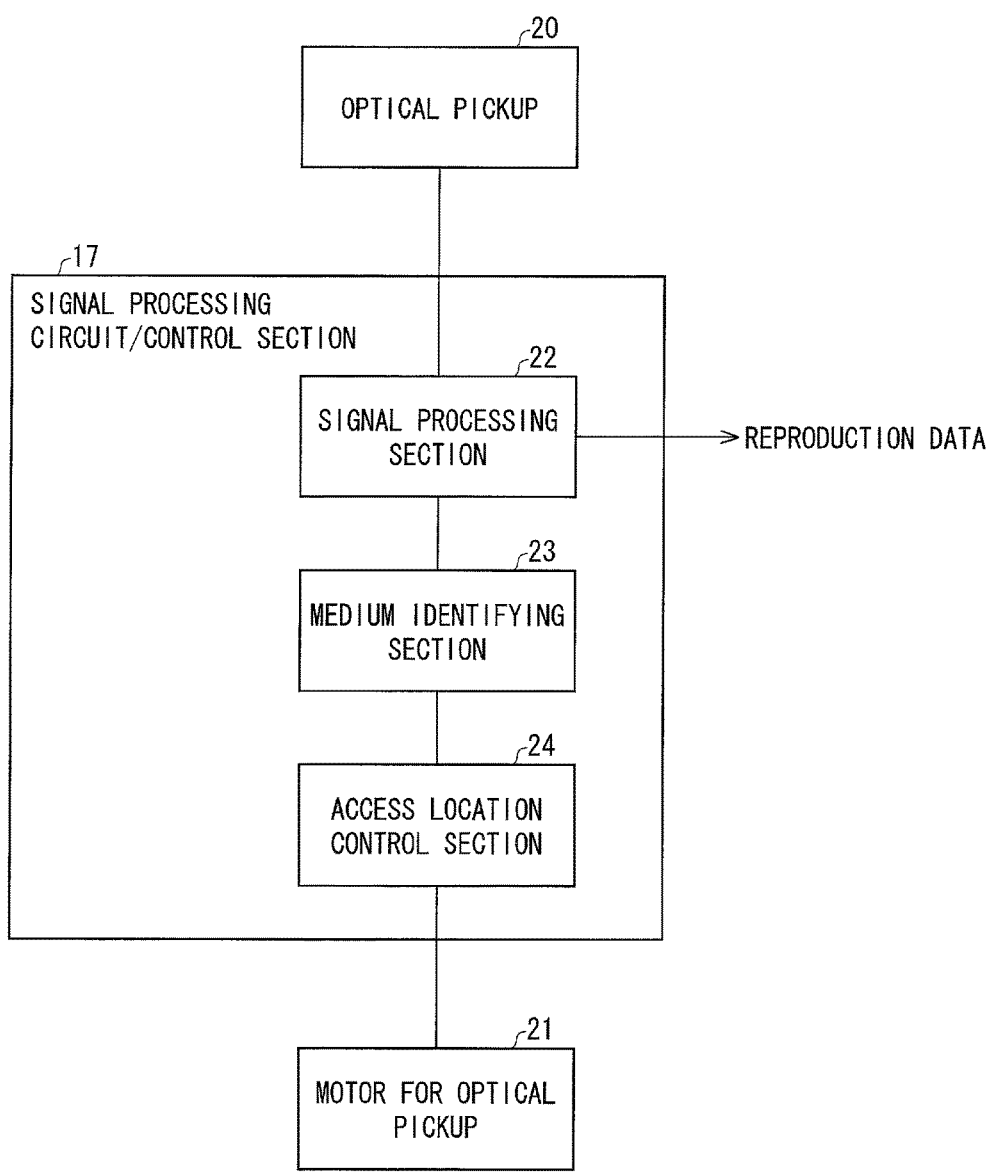
FIG. 18 is a block diagram schematically illustrating a configuration example of a signal processing circuit/control section included in the reproduction device.
Figure 19:
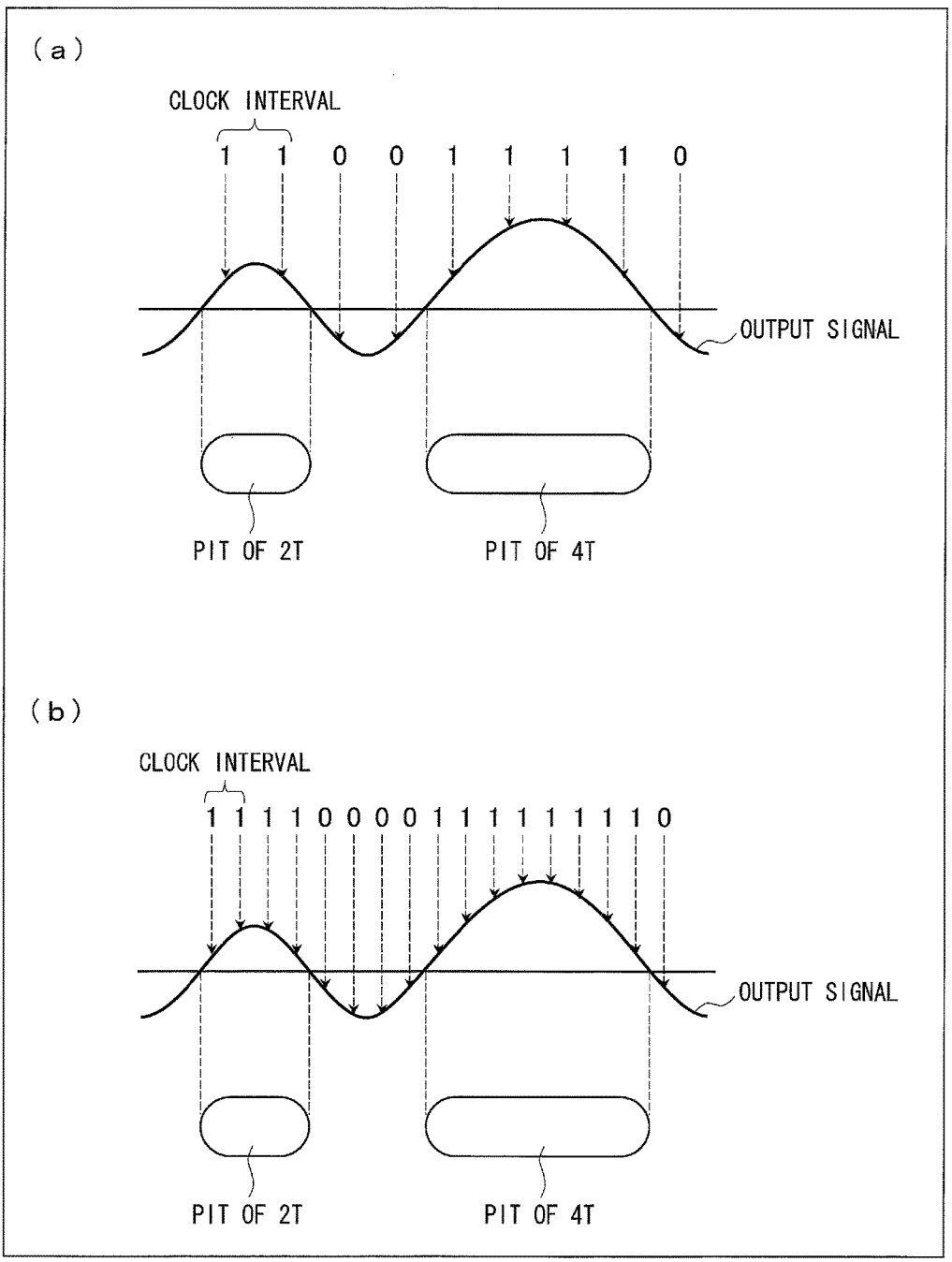
FIG. 19 is a view illustrating, in (a), a relation between a pit and an output signal in a case where a normal medium is sampled at a reproduction clock suitable for the normal medium and is then decoded by PRML and, in (b), a relation between a pit and an output signal in a case where a normal medium is sampled at a reproduction clock suitable for a super-resolution medium and is then decoded by PRML.

The following description will discuss still another embodiment of the present invention with reference to FIGS. 17 through 19. For convenience of explanation, identical reference numerals are given to members having functions identical to those described in Embodiments 1 through 4, and descriptions of such members are omitted in Embodiment 5.

<Configuration of Reproduction Device 10>

FIG. 17 schematically illustrates a configuration of a reproduction device 10 in accordance with Embodiment 5. The reproduction device 10 of Embodiment 5 is capable of reproducing both of (i) the super-resolution medium 1 in accordance with any one of Embodiments 1 through 4 and (ii) a normal medium.

As illustrated in FIG. 17, the reproduction device 10 includes a laser control circuit 14, a signal processing circuit/control section 17 (signal processing unit), a servo processing circuit 18 (servo processing unit), a spindle motor 19, an optical pickup 20 (reproduction light irradiation unit), and a motor 21 for the optical pickup 20. The optical pickup 20 irradiates the super-resolution medium 1 or the normal medium with reproduction light, and includes a polarization beam splitter 12, a laser light source 13, and a detecting device 15. Note that an optical information recording medium 11 illustrated in FIG. 17 can be the super-resolution medium 1 or the normal medium.

In the reproduction device 10, first, the optical information recording medium 11 is rotated by the spindle motor 19, and the optical pickup 20 is moved to a predetermined location by the motor 21. Then, in the reproduction device 10, an intensity of reproduction light, which is to be emitted from the laser light source 13, is set to a predetermined intensity, and the laser control circuit 14 causes the laser light source 13 to emit the reproduction light. This reproduction light reaches the optical information recording medium 11 via the polarization beam splitter 12, and then light reflected from the optical information recording medium 11 reaches the detecting device 15 via the polarization beam splitter 12.

Based on the reflected light which has reached the detecting device 15, the detecting device 15 outputs an electric signal. This electric signal is supplied to the servo processing circuit 18, and the servo processing circuit 18 carries out various servo controls (for example, a focusing servo and a tracking servo are controlled). The electric signal is also supplied to the signal processing circuit/control section 17. Based on this electric signal, the signal processing circuit/control section 17 (i) gives a driving instruction to the motor 21, or (ii) generates reproduction data through decoding and supplies the reproduction data to an external device (e.g., a display device).

FIG. 18 illustrates a configuration of the signal processing circuit/control section 17. The signal processing circuit/control section 17 decodes, by the PR(12221)ML method, a reproduction signal waveform of, for example, reproduction data which has been obtained by irradiating the data region 2 with reproduction light emitted by the optical pickup 20. As illustrated in FIG. 18, the signal processing circuit/control section 17 includes a signal processing section 22, a medium identifying section 23, and an access location control section 24.

The signal processing section 22 processes an electric signal which is indicative of medium identification information and has been supplied from the optical pickup 20, and supplies the electric signal thus processed to the medium identifying section 23. Based on the electric signal which is indicative of the medium identification information and has been supplied from the signal processing section 22, the medium identifying section 23 identifies the optical information recording medium 11. Further, the medium identifying section 23 decodes, as the reproduction data, an electric signal which is indicative of a content and has been supplied from the optical pickup 20, and outputs the reproduction data to the external device.

The access location control section 24 controls the motor 21 so that the optical pickup 20 accesses an intended location of the optical information recording medium 11. Note that, in a case where the data region 2 and the medium information region 3 are different in track pitch in the super-resolution medium 1, it is preferable that the access location control section 24 control the access location based on a result of the identification of the optical information storage medium 11 carried out by the medium identifying section 23.

The following description will discuss how the servo processing circuit 18 operates the tracking servo. For example, there has been a tracking servo operating method in which a detector which is of the detecting device 15 and receives reflected light is divided into at least two sections, and a phase difference which occurs between detection signals from the sections of the detector is utilized. In this operating method, however, tracking may become unstable in a region (data region 2) with high recording density, e.g., in a region whose storage capacity corresponds to 45 GB or more in a disk having a diameter of 120 mm, and thus there is a possibility that sequential reproduction from the medium information region 3 to the data region 2 cannot be carried out. From this, in the data region 2, it is necessary to change the tracking servo operating method.

On the other hand, in a three-beam method, the PP method, the DPP method, or the like, a sufficient tracking error signal can be obtained even in a region having high recording density, and it is therefore possible to stably carry out tracking. By employing, in the servo processing circuit 18, a tracking servo operating method (e.g., the three-beam method, the PP method, or the DPP method) in which both of the data region 2 and the medium information region 3 can be tracked, it is possible to promptly, surely, and sequentially reproduce pieces of information recorded in the two regions which are different in recording density, even in a case, as in the super-resolution medium 1, where recording density of one of regions is higher than that of the other of the regions.

Further, it is preferable that the signal processing circuit/control section 17 include a reproduction clock control section or a reproduction speed control section (both are not illustrated).

In a case where the signal processing circuit/control section 17 includes the reproduction clock control section, the reproduction clock control section (i) keeps a reproduction clock which is used in the signal processing section 22 unchanged (i.e., maintains a reproduction clock suitable for the normal medium) or (ii) switches the reproduction clock to a reproduction clock suitable for the super-resolution medium 1, depending on the result of the identification of the optical information recording medium 11 carried out by the medium identifying section 23. In a case where the signal processing circuit/control section 17 includes the reproduction speed control section, the reproduction speed control section (i) keeps a reproduction speed unchanged (i.e., maintains a reproduction speed suitable for the normal medium) by controlling the spindle motor 19, or (ii) switches the reproduction speed to a reproduction speed suitable for the super-resolution medium 1, depending on the result of the identification of the optical information recording medium 11 carried out by the medium identifying section 23.

The above description has dealt with the process example in which the medium identification information of the optical information recording medium 11 contains reproduction speed information. Note, however, that the reproduction speed information is not always contained in the medium identification information. In a case where the reproduction speed information is not contained in the medium identification information, the signal processing circuit/control section 17 is configured to include a reproduction speed information obtaining section (reproduction speed information obtaining unit) (not illustrated). By causing the reproduction speed information obtained by the reproduction speed information obtaining section to be outputted to the reproduction clock control section or to the reproduction speed control section, it is possible to achieve a reproduction clock and a reproduction speed that are suitable for the optical information recording medium 11 inserted into the reproduction device 10, even in a case where the medium identifying section 23 is not provided.

Furthermore, it is preferable that the signal processing circuit/control section 17 include a power control section (not illustrated).

In a case where the signal processing circuit/control section 17 includes the power control section, the power control section (i) keeps an intensity of reproduction light which is to be emitted from the laser light source 13 unchanged (i.e., maintains a reproduction light intensity suitable for the normal medium) or (ii) switches, by controlling the laser control circuit 14, the intensity of reproduction light to an intensity which is suitable for the super-resolution medium 1, depending on the result of the identification of the optical information recording medium 11 carried out by the medium identifying section 23.

The above description has dealt with the process example in which the medium identification information of the optical information recording medium 11 contains reproduction light intensity information. Note, however, that the reproduction light intensity information is not always contained in the medium identification information. In a case where the reproduction light intensity information is not contained in the medium identification information, the signal processing circuit/control section 17 is configured to include a reproduction light intensity information obtaining section (reproduction light intensity information obtaining unit) (not illustrated). By causing the reproduction light intensity information obtained by the reproduction light intensity information obtaining section to be outputted to the power control section, it is possible to achieve emission of reproduction light at an intensity that is suitable for the optical information recording medium 11 inserted into the reproduction device 10, even in a case the medium identifying section 23 is not provided.

Furthermore, it is preferable that the signal processing circuit/control section 17 include a polarity identifying section (polarity identifying unit) (not illustrated).

In a case where the signal processing circuit/control section 17 includes the polarity identifying section, the signal processing section 22 processes an electric signal (polarity identifying signal) indicative of polarity information supplied from the optical pickup 20, and supplies the electric signal thus processed to the polarity identifying section. Based on the polarity identifying signal supplied from the signal processing section 22, the polarity identifying section identifies a polarity of pits of the optical information recording medium 11. The servo processing section 18 then operates a tracking servo based on the result of identifying, by the polarity identifying section, the polarity of the pits of the optical information recording medium 11.

Furthermore, it is preferable that the signal processing circuit/control section 17 include a region location information recognition section (region location information recognition unit) and an information reproduction condition control section (information reproduction condition control unit).

In a case where the signal processing circuit/control section 17 includes the region location information recognition section and the information reproduction condition control section, the signal processing section 22 processes an electric signal (data region location signal) which is indicative of data region location information and has been supplied from the optical pickup 20, and supplies the electric signal thus processed to the region location information recognition section. Based on the data region location signal supplied from the signal processing section 22, the region location information recognition section recognizes a location of a data region in the optical information recording medium 11. Based on the location of the data region which location has been recognized by the region location information recognition section, the information reproduction condition control section switches the information reproduction condition to an information reproduction condition suitable for the data region. That is, by controlling the laser control circuit 14 and/or the spindle motor 19, the information reproduction condition control section switches the reproduction light intensity and/or the reproduction speed to a reproduction light intensity and/or a reproduction speed suitable for the super-resolution medium 1.

<Operational Processes of Reproduction Device 10>

The following description will discuss operational processes of the reproduction device 10.

When the optical information recording medium 11 has been inserted in the reproduction device 10, the access location control section 24 of the signal process circuit/control section 17 controls the motor 21 for the optical pickup 20 so that a medium information region which is an initial access location for reproducing the optical information recording medium 11 is irradiated with reproduction light which is emitted by the laser light source 13 at a reproduction light intensity that (i) is for the normal medium and (ii) is predetermined for an initial stage of reproduction. Then, the medium identification information (i) that is recorded in the medium information region and (ii) that indicates whether the optical information recording medium 11 is the super-resolution medium or the normal medium, i.e., whether or not a data region of the optical information recording medium 11 is in a super-resolution form, is processed by the signal processing section 22 of the signal processing circuit/control section 17 via the detecting device 15, and the optical information recording medium 11 is then identified by the medium identifying section 23.

After that, the data region 2 is accessed, and a content recorded in the data region 2 is reproduced as reproduction data through the detecting device 15 and the signal processing section 22.

The following description will discuss how the signal processing section 22 carries out decoding. In the BDs in which information is recorded by the 1-7 PP modulation recording method at a density higher than that of CDs and/or DVDs, the partial response maximum likelihood (PRML) decoding is used. Examples of the PRML encompass the PR(12221)ML that is used in BDXL (TM).

In a case where a modulation recording method by which information is recorded in the data region 2 is, for example, the modified frequency modulation (MFM) recording method, information is recorded by use of pits and spaces of 1T, 1.5T, and 2T, and this restricts a degree of freedom in shape of pits P1 that is selectable to make the data region 2 have a reflectance that is substantially identical with that of the medium information region 3. For this reason, there is a possibility that proper reproduction signal quality cannot be maintained. However, in a case of an optical information recording medium in which information is recorded by the 1-7 PP modulation recording method, information is recorded by use of pits and spaces of from 2T to 8T. Further, a reflected light amount is defined by mainly a length of the space of 8T which hardly exerts influence on reproduction signal quality. Therefore, in a case where the 1-7 PP modulation recording method is employed to record information in the super-resolution medium 1, it is possible to enhance the degree of freedom in selectable shape of the pits P1, and this makes it possible to produce the super-resolution medium 1 with ease.

In addition, in Embodiment 5, the PR(12221)ML method is employed as a decoding method of the signal processing section 22. That is, in the reproduction method of Embodiment 5, a reproduction signal waveform of reproduction data, etc. that has been obtained by irradiating the data region 2 with reproduction light is decoded by the PR(12221)ML method. This allows the reproduction device 10 to handle the super-resolution medium 1 which has a high degree of freedom in selectable shape of the pits P1, and it is possible to reproduce information with high reliability while maintaining proper reproduction signal quality.

Note that the decoding method of the signal processing section 22 is not limited to the PR(12221)ML method, and may be a binary detection method, a PR(1221)ML method, or the like, provided that such a decoding method makes it possible to decode information which has been recorded in the super-resolution medium 1 by a given modulation method.

(Another Example of Operational Processes of Reproduction Device 10)

The following description will discuss another example of operational processes that the reproduction device 10 carries out in a case where the signal processing circuit/control section 17 includes (i) the reproduction clock control section, (ii) the power control section, (iii) the polarity identifying section, (iv) the region location information recognition section, and (v) the information reproduction condition control section. The following description will mainly discuss how the operational processes of this example are different from those of the reproduction device 10 described above.

The medium identifying section 23 first identifies the optical information recording medium 11. In a case where a result of the identification indicates that the optical information recording medium 11 is a normal medium, an intensity of and a reproduction clock of reproduction light are kept unchanged, and a data region of the normal medium is accessed. In a case where the result of the identification carried out by the medium identifying section 23 indicates that the optical information recording medium 11 is the super-resolution medium 1, the power control section can control the laser control circuit 14 based on the identification result so that the reproduction light is adjusted to have a predetermined intensity suitable for the super-resolution medium 1. Concurrently with this adjustment, the reproduction clock control section can change, based on the identification result, the reproduction clock to a predetermined reproduction clock for the super-resolution medium 1.

Further, in a case where at least the PP method, the DPP method, or the like is used as a tracking servo operating method, pit polarity information is reproduced (i) which is recorded in the medium information region 3 of the super-resolution medium 1 and (ii) which indicates whether the pits P1 and P2 are in the in-pit form or in the on-pit form. A pit polarity signal indicative of the pit polarity information is supplied to the signal processing section 22 via the detecting device 15, and is then processed by the signal processing section 22. After that, the polarity identifying section identifies a polarity of the pits P1 and P2. Based on a result of identifying the polarity of the pits P1 and P2 by the polarity identifying section, the servo processing circuit 18 selects a servo-process that is suitable for the tracking servo for the super-resolution medium 1.

Subsequently, the data region location information is reproduced (i) which is recorded in the medium information region 3 and (ii) which indicates a location of the data region 2. A data region location signal indicative of the data region location information is supplied to the signal processing section 22 via the detecting device 15, and is then processed by the signal processing section 22. After that, the region location information recognition section recognizes the location of the data region 2.

Subsequently, the data region 2 is accessed at a reproduction light intensity for the super-resolution medium 1 and, based on the location of the data region 2 which location has been recognized by the region location information recognition section, the information reproduction condition control section switches the information reproduction condition to an information reproduction condition suitable for the data region 2. That is, by controlling the laser control circuit 14 and/or the spindle motor 19, the information reproduction condition control section switches the reproduction light intensity and/or the reproduction speed to a reproduction light intensity and/or a reproduction speed suitable for the data region 2. As such, a content recorded in the data region 2 is reproduced as reproduction data through the detecting device 15 and the signal processing section 22.

The above description has dealt with the processes to be carried out in a case where the medium identification information of the optical information recording medium 11 contains the reproduction speed information and the reproduction light intensity information. Note, however, that the reproduction speed information is not always contained in the medium identification information. In a case where the reproduction speed information is not contained in the medium identification information, the signal processing circuit/control section 17 includes the reproduction speed information obtaining section. In a case where the optical information recording medium 11 has been identified as the super-resolution medium 1 as a result of the identification carried out by the medium identifying section 23, a reproduction signal indicative of the reproduction speed information is supplied from the reproduction speed information obtaining section to the reproduction clock control section or to the reproduction speed control section via the detecting device 15 and the signal processing section 22 so that, based on the reproduction signal, the reproduction clock is changed to a predetermined reproduction clock for the super-resolution medium 1.

Further, the reproduction light intensity information is not always contained in the medium identification information. In a case where the reproduction light intensity information is not contained in the medium identification information, the signal processing circuit/control section 17 includes the reproduction light intensity obtaining section. In a case where the optical information recording medium 11 has been identified as the super-resolution medium 1 as a result of the identification carried out by the medium identifying section 23, a reproduction signal indicative of the reproduction light intensity information is supplied from the reproduction light intensity information obtaining section to the power control section via the detecting device 15 and the signal processing section 22 so that the laser control circuit 14 is controlled to adjust, based on the reproduction signal, the reproduction light intensity to be a predetermined reproduction light intensity suitable for the super-resolution medium 1.

As such, since the super-resolution medium 1 is configured as described above, the reproduction device 10 can easily and accurately identify, at a low reproduction light intensity for the normal medium, whether or not an inserted optical information recording medium is the super-resolution medium 1. The reproduction device 10 can thus reproduce both of the super-resolution medium 1 and the normal medium. Further, since the identification can be carried out at the low reproduction light intensity for the normal medium, (i) it is possible to reduce electric power consumed by the reproduction device 10 and (ii) the normal medium will not be broken due to the reproduction light intensity for the super-resolution medium 1.

In a case where the reproduction device 10 reproduces pieces of information recorded in the super-resolution medium 1, the reproduction device 10 can deal with the reflectance obtained from the data region 2 as being identical with the reflectance obtained from the medium information region 3. Therefore, during the sequential reproduction, the reproduction device 10 can reproduce information from a second one of regions without repeatedly carrying out a control that (i) is included in reproduction controls for a first one of the regions and (ii) can be maintained in the second one of the regions.

<Reasons for Carrying Out Above Processes>

(Reason for Switching Reproduction Clock)

The following description will discuss, with reference to (a) and (b) of FIG. 19, the reason why it is preferable that the reproduction device 1 switch reproduction clocks between the super-resolution medium 1 and the normal medium. In the descriptions below, examples are described (i) in which a read-only normal medium is reproduced at a reproduction clock for the normal medium and (ii) in which the read-only normal medium is reproduced at a reproduction clock for the super-resolution medium 1.

Note that pieces of information are recorded in the normal medium by the 1-7 PP modulation method. That is, based on a length T of a channel bit, pits having lengths of from a shortest pit of 2T to a longest pit of 8T are provided on a substrate. Further, reproduction of the optical information recording medium is carried out in the following manner. That is, (i) pits provided on the substrate are irradiated with reproduction light, (ii) an output signal obtained by the reflected light from the pits is sampled at the reproduction clock, and (iii) a result of the sampling is decoded by PRML so that the output signal is reproduced. (a) of FIG. 19 illustrates a state in which the normal medium is sampled at the reproduction clock for the normal medium and is then decoded by PRML. In this state, the output signal corresponds to pits illustrated on a lower side of (a) of FIG. 19. (b) of FIG. 19 illustrates a state in which the normal medium is sampled at the reproduction clock for the super-resolution medium 1 and is then decoded by PRML. In this state, the output signal corresponds to pits illustrated on a lower side of (b) of FIG. 19.

The following description will discuss a case where the normal medium is reproduced at the reproduction clock for the super-resolution medium 1. Note that the super-resolution medium 1 is twice a linear density of the normal medium. From this, the reproduction clock for the super-resolution medium 1 has a width that is half of the reproduction clock for the normal medium.

In a case where the normal medium is reproduced at the reproduction clock for the super-resolution medium 1, a signal decoded by the PRML indicates "1•1•1•1•0•0•0•0 1•1•1•1•1•1•1" (see (b) of FIG. 19). Therefore, in order to cause the decoded signal to be in a state identical with that of a case where the normal medium is reproduced as illustrated in (a) of FIG. 19, it is necessary to process (i) the signal of "1•1•1•1" as a pit of 2T and (ii) the signal of "1•1•1•1•1•1•1" as a pit of 4T, and this complicates the circuit. Therefore, in order to optimally reproduce the normal medium and the super-resolution medium 1, it is preferable to change reproduction clocks between the normal medium and the super-resolution medium 1. For the above reason, it is preferable that the reproduction device 10 switch reproduction clocks between the super-resolution medium 1 and the normal medium.

Further, the reproduction clock switching information is recorded by pits P2 whose length is longer than that of the optical system resolution limit of the reproduction device 10. Therefore, the super-resolution medium 1 can be reproduced at the reproduction clock for the normal medium, and it is therefore unnecessary to carry out useless switching of the reproduction clocks.

Further, in a case where reproduction clocks are switched between the normal medium and the super-resolution medium 1, a circuit load of the reproduction device increases as follows, for example, two reference oscillators are needed. In view of this, it is possible to switch reproduction speeds instead of the reproduction clocks.

For example, in a case where (i) the super-resolution medium 1 is twice the linear density of the normal medium and (ii) the reproduction speed is switched to a half speed, signals to be reproduced are transferred at the same speed as that used for the normal medium. In such a case, a decrease in reliability of reproduction as above described will not occur even if the reproduction clocks are not switched. Therefore, it is possible to employ the configuration in which the reproduction speeds are switched instead of the reproduction clocks.

Note that, in a case of the configuration in which the reproduction speeds are switched, the circuit load can be reduced as compared with the configuration in which the reproduction clocks are switched but a transfer rate of the super-resolution medium 1 is not different from that of the normal medium. In contrast, in a case of the configuration in which the reproduction clocks are switched, the transfer rate for transferring information from the super-resolution medium 1 can be heightened.

(Reason for Switching Reproduction Light Intensity)

The following description will discuss the reason why it is preferable that the reproduction device 10 switch a reproduction light intensity between the super-resolution medium 1 and the normal medium. In a case where super-resolution reproduction is enabled by heat, an excessively low reproduction light intensity causes insufficient heat and accordingly the super-resolution reproduction cannot be carried out. In such a case, it is necessary to reproduce information recorded at least in the data region 2 of the super-resolution medium 1 at a reproduction light intensity higher than that for the normal medium. Meanwhile, it is possible to avoid rapid deterioration of the normal medium by reproducing the normal medium at the reproduction light intensity for the normal medium. Further, the reproduction light intensity information is recorded by the pits P2 whose length is longer than that of the optical system resolution limit of the reproduction device 10. Therefore, it is possible to reproduce the reproduction light intensity information of the super-resolution medium 1 at the reproduction light intensity for the normal medium. It is therefore unnecessary to carry out useless switching of the reproduction clocks.

(Reason for Identifying Pit Polarity)

The following description will discuss the reason why it is preferable that the reproduction device 10 identify a polarity of the pits P1 and P2. In a case where the reproduction device 10 operates a tracking servo by use of, for example, the PP method, the DPP method, or the like, a polarity (positive or negative) of a tracking error signal varies depending on the polarity of the pits P1 and P2. From this, in a case where the polarity of the pits P1 and P2 is not to be identified, it is impossible to immediately determine whether a tracking error signal which is in an on-track state is (i) at a center of amplitude of a tracking error signal whose first derivation value relating to a distance from a center of the super-resolution medium 1 is positive or (ii) at a center of amplitude of a tracking error signal whose first derivation value is negative. Therefore, in such a case, it is necessary to check whether or not the irradiation location of reproduction light is in the on-track state by checking, for example, whether or not a reflected light amount varies due to the presence of the pits P1 and P2.

On the other hand, in a case where the reproduction device 10 identifies the polarity of the pits P1 and P2 based on the pit polarity information recorded in the super-resolution medium 1, it is possible to quickly operate the tracking servo with respect to the super-resolution medium 1. Further, in such a case, it is possible to enhance a degree of freedom of methods for operating the tracking servo, and this makes it easy to produce the reproduction device 10.

(Reason for Recognizing Location of Data Region 2)

The following description will discuss the reason why it is preferable that the reproduction device 10 recognize the location of the data region 2. For example, in a case where (i) super-resolution reproduction is enabled by heat and, (ii) in order to reproduce information recorded in the medium information region 3 with good quality and to reduce a load applied to the optical pickup 20, reproduction speeds and reproduction light intensities for the data region 2 and for the medium information region 3 are set to be identical with a maximum reproduction speed and a minimum reproduction light intensity at each of which the information recorded in the medium information region 3 can be reproduced, heat that is needed for super-resolution reproduction becomes insufficient in the data region 2 in which recording density is high, and it may therefore be impossible to carry out super-resolution reproduction. In view of this, the reproduction speed is lowered or the reproduction light intensity is heightened when information recorded in the data region 2 is reproduced, and it is thus possible to reproduce the information recorded in the data region 2 with good quality and to reduce the load applied to the optical pickup 20.

As such, in a case where the location of the data region 2 is recognized, it is possible to switch the reproduction condition to a reproduction condition in which the maximum reproduction speed and the minimum reproduction light intensity that are acceptable for the data region 2 and the medium information region 3 are taken into consideration. This makes it possible to (i) reproduce pieces of information recorded in the data region 2 and the medium information region 3 with good quality and (ii) reduce the load applied to the optical pickup 20.

[Example of Configuration Achieved by Software]

A control block of the reproduction device 10 (in particular, the signal processing circuit/control section 17) can be realized by a logic circuit (hardware) provided in an integrated circuit (IC chip) or the like or can be alternatively realized by software as executed by a CPU (Central Processing Unit).

In the latter case, the reproduction device 10 includes a CPU that executes instructions of a program that is software realizing the foregoing functions; ROM (Read Only Memory) or a storage device (each referred to as "storage medium") in which the program and various kinds of data are stored so as to be readable by a computer (or a CPU); and RAM (Random Access Memory) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Main Points]

An optical information recording medium (super-resolution medium 1) in accordance with an aspect 1 of the present invention includes: a recording layer which includes (i) a first region in which information is recorded by a first pit row that includes a pit whose length is shorter than that of an optical system resolution limit of a reproduction device and (ii) a second region in which information is recorded by a second pit row that is made up of pits whose length is equal to or longer than that of the optical system resolution limit, in a case where (i) a reflectance calculated from a reflected light amount obtained from a longest pit or a longest space in the first pit row is defined as a first reflectance and (ii) a reflectance calculated from a reflected light amount obtained from a longest pit or a longest space in the second pit row is defined as a second reflectance, the first pit row being formed such that the first reflectance becomes substantially identical with the second reflectance.

According to the configuration, information is recorded in the first region by the first pit row which includes the pit whose length is shorter than that of the optical system resolution limit of the reproduction device. Moreover, information is recorded in the second region by the second pit row which is made up of the pits whose length is equal to or longer than that of the optical system resolution limit.

In general, an information recording density in an optical information recording medium varies depending on a length of a shortest pit. Moreover, the pits forming the first pit row are different in length from the pits forming the second pit row. Therefore, an information recording density in the first region is different from that in the second region. In this case, there is a possibility that the first reflectance and the second reflectance are different from each other so as to be assumed by the reproduction device as being not substantially identical with each other, and the difference influences reproduction of information.

In the optical information recording medium in accordance with the aspect of the present invention, the first pit row is formed such that the first reflectance becomes substantially identical with the second reflectance.

This makes it possible to reduce a possibility that is caused because the first reflectance and the second reflectance are not substantially identical with each other during sequential reproduction across different regions. For example, it is possible to reduce a possibility that a size of an irradiation region changes which is formed by reproduction light on an optical information recording medium. Therefore, during the sequential reproduction, it is possible to promptly and surely reproduce information without repeatedly carrying out focus control.

That is, during the sequential reproduction, it is possible to reproduce information from a second one of regions without repeatedly carrying out a control that (i) is included in reproduction controls for a first one of the regions and (ii) can be maintained in the second one of the regions. This makes it possible to improve information reproduction quality.

In the second region, the second pit row is formed which is made up of the pits whose length is equal to or longer than that of the optical system resolution limit of the reproduction device. It is therefore possible to reproduce information stored in the second region with a reproduction light intensity that is suitable for reproducing information in a normal medium. Note that examples of the information encompass various information (relating to the super-resolution medium) such as medium identification information, reproduction speed information, and a unique number of medium.

Note that the wording "the first reflectance becomes substantially identical with the second reflectance" can be rephrased as follows: that is, the first reflectance has a magnitude with which the reproduction device can deal with the first and second reflectances as being identical with each other, without providing different definitions of reflectance in respective of the first region and the second region with respect to the optical information recording medium (super-resolution medium 1) or the reproduction device.

In an aspect 2 of the present invention, the optical information recording medium is preferably arranged such that, in the aspect 1, in a case where (i) a first space which is longest among a plurality of first spaces (space S1) that are formed between a plurality of pits constituting the first pit row is a longest first space (longest space S1max) and (ii) a second space which is longest among a plurality of second spaces (space S2) that are formed between a plurality of pits constituting the second pit row is a longest second space (longest space S2max), the first pit row is formed such that a reflectance obtained from the longest first space becomes substantially identical with a reflectance obtained from the longest second space.

According to the configuration, the first pit row is formed in the first region such that a reflectance obtained from the longest first space becomes substantially identical with a reflectance obtained from the longest second space. Therefore, during the sequential reproduction, it is possible to promptly and surely reproduce information.

In an aspect 3 of the present invention, the optical information recording medium is preferably arranged such that, in the aspect 2, a length of the longest first space is equal to or longer than a diameter of an irradiation region which is formed, on the optical information recording medium, by reproduction light emitted by the reproduction device.

According to the configuration, the length of the longest first space is equal to or longer than the diameter of the irradiation region which is formed by the reproduction light on the optical information recording medium. With the arrangement, in a case where the longest first space is irradiated with reproduction light, pits which constitute the first pit row and exist on a track on which the longest first space exists will not be irradiated with the reproduction light. Therefore, the first reflectance becomes a reflectance that is derived only from the longest first space.

Meanwhile, in the second region, a length of the longest second space is longer than a diameter of an irradiation region formed by the reproduction light, and therefore the second reflectance becomes a reflectance that is derived only from the longest second space.

From this, by forming the pits as above described, it is possible to cause the reproduction device to deal with the first reflectance as being substantially identical with the second reflectance.

An optical information recording medium in accordance with an aspect 4 of the present invention is an optical information recording medium which is to be reproduced by a reproduction device that (i) emits reproduction light having a wavelength ($\lambda$) of 405 nm and (ii) includes an objective lens having a numerical aperture (NA) of 0.85, the optical information recording medium including: a recording layer which includes (i) a first region in which information is recorded by a first pit row that includes a pit whose length is shorter than 119 nm and (ii) a second region in which information is recorded by a second pit row that is made up of pits whose length is equal to or longer than 119 nm, in a case where (i) a reflectance calculated from a reflected light amount obtained from a longest pit or a longest space in the first pit row is defined as a first reflectance and (ii) a reflectance calculated from a reflected light amount obtained from a longest pit or a longest space in the second pit row is defined as a second reflectance, the first pit row being formed such that the first reflectance becomes substantially identical with the second reflectance.

According to the configuration, in addition to an effect brought about by the aspect 1, it is possible to carry out reproduction with a super-resolution technique in the first region and to carry out reproduction with a non-super-resolution technique in the second region by changing a reproduction light intensity or the like.

In an aspect 5 of the present invention, the optical information recording medium is preferably arranged, in any of the aspects 1 through 4, such that the first pit row is formed by use of a 1-7 PP modulation recording method.

According to the configuration, it is possible to enhance an information recording density, as compared with a case where information is recorded by use of pits having identical lengths. Moreover, it is possible to obtain good signal quality.

In an aspect 6 of the present invention, the optical information recording medium is preferably arranged, in any of the aspects 1 through 5, such that the second region includes medium identification information for specifying a type of a medium.

According to the configuration, it is possible to reproduce medium identification information with a reproduction light intensity that is suitable for reproducing information in a normal medium. Therefore, it is possible to identify that the optical information recording medium is a super-resolution medium, with use of the reproduction light intensity that is suitable for reproducing information in the normal medium.

A reproduction method in accordance with an aspect 7 of the present invention is a method for reproducing an optical information recording medium of the aspect 5, the method preferably including the step of: decoding, with a PR(12221) ML method, a reproduction signal waveform which has been obtained by irradiating the first region with reproduction light.

According to the configuration, it is possible to (i) carry out reproduction that corresponds to an optical information recording medium in which a degree of freedom in shape of pits forming the first pit row in the first region is high, i.e., corresponds to an optical information recording medium which can be easily produced and (ii) reproduce information with high reliability while maintaining good reproduction signal quality.

A reproduction device in accordance with an aspect 8 of the present invention is a reproduction device by which the optical information recording medium of the aspect 5 is reproducible, the reproduction device preferably including: a reproduction light irradiation unit for irradiating the optical information recording medium with reproduction light; and a signal processing unit for decoding, with a PR(12221)ML method, a reproduction signal waveform which has been obtained by irradiating the first region with the reproduction light emitted by the reproduction light irradiation unit.

According to the configuration, (i) the reproduction device is compatible with an optical information recording medium in which a degree of freedom in shape of pits forming the first pit row in the first region is high, i.e., compatible with an optical information recording medium which can be easily produced and (ii) reproduce information with high reliability while maintaining good reproduction signal quality.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

The optical information recording medium (super-resolution medium) of the present invention is suitable for various optical disks such as an optically-read disk, a magneto-optical disk, and a phase-change disk, and is also applicable to an information recording medium (such as a magnetic disk) which includes a recording mark whose length is shorter than that of an optical system resolution limit. Moreover, the reproduction method and the reproduction device in accordance with the present invention can be applied to a method and a device for reproducing the optical information recording medium in accordance with the present invention.

REFERENCE SIGNS LIST

1: Super-resolution medium (optical information recording medium)
2: Data region (first region)
3: Medium information region (second region)
5: Functional layer
10: Reproduction device
17: Signal processing circuit/control section (signal processing unit)
20: Optical pickup (reproduction light irradiation unit)
P1: Pit (pits in first pit row)
P2: Pit (pits in second pit row)
P1max: Longest pit
P2max: Longest pit
S1max: Longest space
S2max: Longest space
L: Reproduction light
λ: Wavelength
NA: Numerical aperture

The invention claimed is:
1. An optical information recording medium comprising:
a recording layer which includes (i) a first region in which information is recorded by a first pit row that includes a pit whose length is shorter than that of an optical system resolution limit of a reproduction device and (ii) a second region in which information is recorded by a second pit row that is made up of pits whose length is equal to or longer than that of the optical system resolution limit,
in a case where (i) a reflectance calculated from a reflected light amount obtained from a longest pit or a longest space in the first pit row is defined as a first reflectance and (ii) a reflectance calculated from a reflected light amount obtained from a longest pit or a longest space in the second pit row is defined as a second reflectance, the first pit row being formed such that the first reflectance becomes substantially identical with the second reflectance, and
region location information indicative of starting location and/or ending location of reproduction of information in the first region being recorded in the second region.
2. An optical information recording medium which is to be reproduced by a reproduction device that (i) emits reproduction light having a wavelength of 405 nm and (ii) includes an objective lens having a numerical aperture of 0.85, said optical information recording medium comprising:
a recording layer which includes (i) a first region in which information is recorded by a first pit row that includes a pit whose length is shorter than 119 nm and (ii) a second region in which information is recorded by a second pit row that is made up of pits whose length is equal to or longer than 119 nm,
in a case where (i) a reflectance calculated from a reflected light amount obtained from a longest pit or a longest space in the first pit row is defined as a first reflectance and (ii) a reflectance calculated from a reflected light amount obtained from a longest pit or a longest space in the second pit row is defined as a second reflectance, the first pit row being formed such that the first reflectance becomes substantially identical with the second reflectance, and
region location information indicative of starting location and/or ending location of reproduction of information in the first region being recorded in the second region.
3. A method for reproducing an optical information recording medium recited in claim 1, said method comprising the step of:
determining a reproduction condition based on the region location information which has been obtained by irradiating the second region with reproduction light.
4. A method for reproducing an optical information recording medium recited in claim 2, said method comprising the step of:
determining a reproduction condition based on the region location information which has been obtained by irradiating the second region with reproduction light.

* * * * *